United States Patent [19]
Hioki

[11] Patent Number: 5,336,594
[45] Date of Patent: Aug. 9, 1994

[54] SILVER HALIDE PHOTOGRAPHIC MATERIAL
[75] Inventor: Takanori Hioki, Kawagawa, Japan
[73] Assignee: Fuji Photo Film Co., Ltd., Kanagawa, Japan
[21] Appl. No.: 56,753
[22] Filed: May 4, 1993
[30] Foreign Application Priority Data May 12, 1992 [JP] Japan .................. 4-145015
[51] Int. Cl.$^5$ .................................. G03C 1/12
[52] U.S. Cl. .................. 430/577; 430/578; 430/581; 430/582; 430/583; 430/584; 430/585; 430/586; 430/587; 430/588
[58] Field of Search .......... 430/581, 584, 583, 585, 430/582, 586, 587, 588, 578, 577

[56] References Cited
U.S. PATENT DOCUMENTS 2,493,748  1/1950  Brooker et al. ............. 430/577
3,582,344  6/1971  Heseltine et al. ........... 430/584
4,940,657  7/1990  Tanaka et al. ............. 430/584

*Primary Examiner*—Thorl Chea
*Attorney, Agent, or Firm*—Sughrue, Mion, Zinn, Macpeak & Seas

[57] ABSTRACT

Disclosed is a silver halide photographic material containing at least one methine compound of formula (I) or (II):

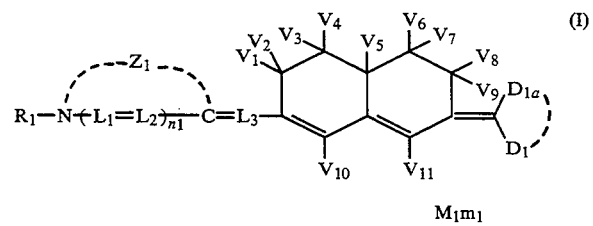

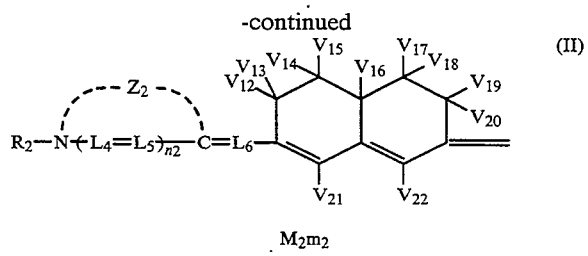

wherein $A_1$:

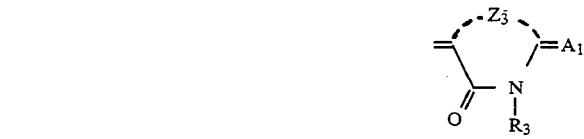

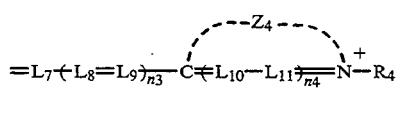

or

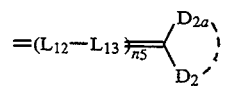

and wherein $Z_1$, $Z_2$, $Z_3$ and $Z_4$ each is an atomic group of forming a 5- or 6-membered N-containing heterocyclic ring; $R_1$, $R_2$ and $R_4$ each is an alkyl group; $R_3$ is an alkyl, aryl or heterocyclic group; $D_1$, $D_{1a}$, $D_2$ and $D_{2a}$ each is an atomic group of forming an acidic nucleus; $V_1$ to $V_{22}$ each is a hydrogen or a monovalent substituent; $L_1$ to $L_{12}$ each is a methine group; $M_1$ and $M_2$ each is a charge-neutralizing pair ion; $m_1$ and $m_2$ each is a number of 0 or more for neutralizing the charge in the molecule; $n_1$, $n_2$ and $n_4$ each are 0 or 1; and $n_3$ and $n_5$ each is an integer of 0 or more. The material has a high sensitivity and storage stability.

9 Claims, No Drawings

SILVER HALIDE PHOTOGRAPHIC MATERIAL

FIELD OF THE INVENTION

The present invention relates to a silver halide photographic material containing methine compound(s). The silver halide photographic material has high sensitivity and high storage stability.

BACKGROUND OF THE INVENTION

The addition of sensitizing dye(s) to a silver halide emulsion to enlarge the sensitive wavelength range of the emulsion so as to optically sensitize is well known in the field of manufacturing silver halide photographic materials.

Many color sensitizing dyes for this purpose have heretofore been known. For instance, they include cyanine dyes, merocyanine dyes, xanthene dyes and others as described in T. H. James, *The Theory of the Photographic Process*, 3rd Ed., pages 198 to 228 (published by Macmillan Co., N.Y., 1966).

When such sensitizing dyes are applied to silver halide emulsions, in general, they must not merely enlarge the sensitive wavelength range of the silver halide emulsions, they must also satisfy the following conditions:

(1) they have a suitable color-sensitizing range;
(2) they have a high sensitizing efficiency and may yield a sufficiently high sensitivity;
(3) they do not cause fogging;
(4) they may sensitize silver halide emulsions so that the sensitivity of the sensitized emulsion does not fluctuate much under variation of the ambient temperature in exposure;
(5) they do not yield any bad interaction with other additives, such as a stabilizer, an antifoggant, a coating aid and a coupler;
(6) when silver halide emulsions to which sensitizing dyes have been added are stored, the sensitivity of the emulsions does not fluctuate; in particular, when they are stored under high temperature and humidity conditions, they are free from fluctuation of sensitivity thereof; and
(7) the sensitizing dyes as added to silver halide emulsions do not diffuse to any other light-sensitive layers to cause color mixing after development.

The above-mentioned conditions are important in preparing silver halide emulsions for silver halide photographic materials. In particular, elevation of the sensitivity of silver halides and improvement of the stability of raw films during storage, satisfying in the above conditions in the (2) and (6) are strongly desired.

Production of cyanine dyes and merocyanine dyes for use in the present invention, which have a cross-linked structure in the methine chain moiety, is described in A. I. Tolmachev, Yu. L. Slominskii, and Academician A. I. Kiprianov, *Dokl. Akad. Nauk SSSR*, Vol. 177, page 869 (1967). Application of only cyanine dyes to silver halide photographic materials is described in U.S. Pat. Nos. 3,582,344 and 5,013,642 and European Patents 420,011 and 432,473, but use of the merocyanine dyes of the present invention has heretofore been unknown.

SUMMARY OF THE INVENTION

An object of the present invention is to provide a methine compound-containing high-sensitivity silver halide photographic material which is hardly fogged and the sensitivity of which is hardly lowered during storage thereof under high temperature and/or high humidity conditions, that is, to provide such a high-sensitivity silver halide photographic material having excellent raw film storability.

These and other objects of the present invention have been attained by a silver halide photographic material containing at least one compound represented by the following formula (I) or (II). More preferably, the material contains a compound represented by formula (I).

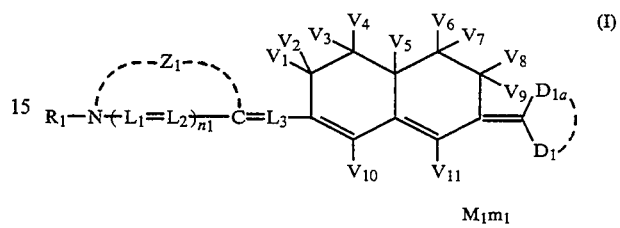

wherein $Z_1$ represents an atomic group necessary for forming a 5-membered or 6-membered nitrogen-containing heterocyclic ring;

$R_1$ represents an alkyl group;

$D_1$ and $D_{1a}$ each represents an atomic group necessary for forming an acyclic or cyclic acidic nucleus;

$V_1$, $V_2$, $V_3$, $V_4$, $V_5$, $V_6$, $V_7$, $V_8$, $V_9$, $V_{10}$ and $V_{11}$ each represents a hydrogen atom or a monovalent substituent;

$L_1$, $L_2$ and $L_3$ each represents a methine group;

$M_1$ represents a charge-neutralizing pair ion;

$m_1$ represents a number of 0 or more necessary for neutralizing the charge in the molecule; and $n_1$ represents 0 or 1;

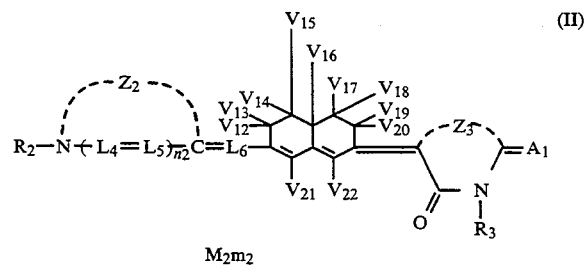

wherein $A_1$:

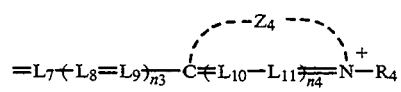

or

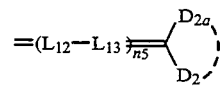

and wherein $Z_2$ and $Z_4$ each has the same meaning as $Z_1$;

$R_2$ and $R_4$ each has the same meaning as $R_1$;

$R_3$ represents an alkyl group, an aryl group or a heterocyclic group;

$D_2$ and $D_{2a}$ each has the same meaning as $D_1$ and $D_{1a}$;

$Z_3$ represents an atomic group necessary for forming a 5-membered or 6-membered nitrogen-containing heterocyclic ring;

$V_{12}$, $V_{13}$, $V_{14}$, $V_{15}$, $V_{16}$, $V_{17}$, $V_{18}$, $V_{19}$, $V_{20}$, $V_{21}$ and $V_{22}$ each has the same meaning as $V_1$, $V_2$, $V_3$, $V_4$, $V_5$, $V_6$, $V_7$, $V_8$, $V_9$, $V_{10}$ and $V_{11}$;

$L_4$, $L_5$, $L_6$, $L_7$, $L_8$, $L_9$, $L_{10}$, $L_{11}$, $L_{12}$ and $L_{13}$ each has the same meaning as $L_1$, $L_2$ and $L_3$;

$M_2$ has the same meaning as $M_1$;

$m_2$ has the same meaning as $m_1$;

$n_2$ and $n_4$ each represents 0 or 1; and $n_3$ and $n_5$ each represents an integer of 0 or more.

DETAILED DESCRIPTION OF THE INVENTION

Compounds of formulae (I) and (II) are described in detail below.

$R_1$, $R_2$ and $R_4$ are each preferably an unsubstituted alkyl group having from 1 to 18 carbon atoms (e.g., methyl, ethyl, propyl, butyl, pentyl, hexyl, octyl, decyl, dodecyl, octadecyl), or a substituted alkyl group {for example, an alkyl group having from 1 to 18 carbon atoms substituted by one or more substituents such as a carboxyl group, a sulfo group, a cyano group, a halogen atom (e.g., fluorine, chlorine, bromine), a hydroxyl group, an alkoxycarbonyl group, having from 2 to 8 carbon atoms (e.g., methoxycarbonyl, ethoxycarbonyl, phenoxycarbonyl, benzyloxycarbonyl), an alkoxy group having from 1 to 8 carbon atoms (e.g., methoxy, ethoxy, benzyloxy, phenethyloxy), a monocyclic aryloxy group having from 6 to 10 carbon atoms (e.g., phenoxy, p-tolyloxy), an acyloxy group having from 1 to 3 carbon atoms (e.g., acetyloxy, propionyloxy), an acyl group having from 1 to 8 carbon atoms (e.g., acetyl, propionyl, benzoyl, mesyl), a carbamoyl group (e.g., unsubstituted carbamoyl, N,N-dimethylcarbamoyl, morpholinocarbonyl, piperidinocarbonyl, methanesulfonylcarbamoyl), a sulfamoyl group (e.g., unsubstituted sulfamoyl, N,N-dimethylsulfonyl, morpholinosulfonyl, piperidinosulfonyl) and an aryl group having from 6 to 10 carbon atoms (e.g., phenyl, 4-chlorophenyl, 4-methylphenyl, α-naphthyl)}. More preferably, they are each an unsubstituted alkyl group (e.g., methyl, ethyl, n-propyl, n-butyl, n-pentyl, n-hexyl), a carboxyalkyl group (e.g., 2-carboxyethyl, carboxymethyl), a sulfoalkyl group (e.g., 2-sulfoethyl, 3-sulfopropyl, 4-sulfobutyl, 3-sulfobutyl), or a methanesulfonylcarbamoylmethyl group.

$M_1 m_1$ and $M_2 m_2$ each is in the formulae to show the absence or presence of a cation or anion therein, to the extent that they are necessary for neutralizing the ionic charge of the respective dyes. Whether a dye is cationic or anionic, or has no net ionic charge depends upon the auxochrome and its substituents. Typical cations in such a dye are inorganic or organic ammonium ions and alkali metal ions; and typical anions may be either an inorganic anion or an organic anion, including, for example, a halide ion (e.g., fluoride ion, chloride ion, bromide ion, iodide ion), a substituted arylsulfonate ion (e.g., p-toluenesulfonate ion, p-chlorobenzenesulfonate ion), an aryldisulfonate ion (e.g., 1,3-benzenedisulfonate ion, 1,5-naphthalenedisulfonate ion, 2,6-naphthalenedisulfonate ion), an alkylsulfate ion (e.g., methylsulfate ion), a sulfate ion, a thiocyanate ion, a perchlorate ion, a tetrafluoroborate ion, a piclate ion, an acetate ion and a trifluoromethanesulfonate ion.

Preferred as $M_1$ and $M_2$ are an ammonium ion, an iodide ion and a p-toluenesulfonate ion.

$m_1$ and $m_2$ each represents a number of 0 or more necessary for neutralizing the charge in the molecule.

Examples of nuclei formed by $Z_1$, $Z_2$ or $Z_4$ include thiazole nuclei {for example, thiazole nuclei (e.g., thiazole, 4-methylthiazole, 4-phenylthiazole, 4,5-dimethylthiazole, 4,5-diphenylthiazole), benzothiazole nuclei (e.g., benzothiazole, 4-chlorobenzothiazole, 5-chlorobenzothiazole, 6-chlorobenzothiazole, 5-nitrobenzothiazole, 4-methylbenzothiazole, 5-methylthiobenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 6-methylthiobenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethylthiobenzothiazole, 5,6-dimethoxybenzothiazole, 5-hydroxy-6-methylbenzothiazole, tetrahydrobenzothiazole, 4-phenylbenzothiazole), naphthothiazole nuclei (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole)}; thiazoline nuclei (for example, thiazoline, 4-methylthiazoline, 4-nitrothiazoline); oxazole nuclei {for example, oxazole nuclei (e.g., oxazole, 4-methyloxazole, 4-nitroxazole, 5-methyloxazole, 4-phenyloxazole, 4,5-diphenyloxazole, 4-ethyloxazole), benzoxazole nuclei (e.g., benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), naphthoxazole nuclei (e.g., naphtho[2,1-d]oxazole, naphtho[1,2-d]oxazole, naphtho[2,3-d]oxazole, 5-nitronaphtho[2,1-d]oxazole)}; oxazoline nuclei (for example, 4,4-dimethyloxazoline); selenazole nuclei {for example, selenazole nuclei (e.g., 4-methylselenazole, 4-nitroselenazole, 4-phenylselenazole); benzoselenazole nuclei (for example, benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), naphthoselenazole nuclei (e.g., naphtho[2,1-d]selenazole, naphtho[1,2-d]selenazole)}; selenazoline nuclei (for example, selenazoline, 4-methylselenazoline), tellurazole nuclei {for example, tellurazole nuclei (e.g., tellurazole, 4-methyltellurazole, 4-phenyltellurazole), benzotellurazole nuclei (e.g., benzotellurazole, 5-chlorobenzotellurazole, 5-methylbenzotellurazole, 5,6-dimethylbenzotellurazole, 6-methoxybenzotellurazole), naphthotellurazole nuclei (e.g., naphtho[2,1-d]tellurazole, naphtho[1,2-d]tellurazole)}; tellurazoline nuclei (for example, tellurazoline, 4-methyltellurazoline), 3,3-dialkylindolenine nuclei (for example, 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolienine, 3,3,5-trimethylindolenine, 3,3-dimethyl-5-chloroindolenine), imidazole nuclei {for example, imidazole nuclei (e.g., 1-alkylimidazole, 1-alkyl-4-phenylimidaozle, 1-arylimidazole), benzimidazoles (e.g., 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifluoromethylbenzimidazole, 1-allyl-5,6-dichlorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole), naphthoimidazole nuclei (e.g., 1-alkylnaphtho[1,2-d]-imidazole, 1-arylnaphtho[1,2-d]imidazole), in which the alkyl moiety preferably has from 1 to 8 carbon atoms and is, for example, an unsubstituted alkyl group such as methyl, ethyl, propyl, isopropyl or butyl, or a hydroxyalkyl group such as 2-hydroxyethyl or 3-hydroxypropyl, and it is especially preferably a methyl or ethyl group; and the aryl moiety is preferably a phenyl group, a halogen-substituted phenyl group such as chloro-substituted phenyl, an alkyl-substituted phenyl group such as methyl-substituted phenyl, or an alkoxy-substituted phenyl group such as methoxy-substituted phenyl}; pyridine nuclei (for example, 2-pyridine, 4-pyridine, 5-methyl-2-pyridine, 3-methyl-4-pyridine); quinoline nuclei {for example, quinoline nuclei (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline, 6-chloro-4-quinoline), isoquinoline nuclei (e.g., 6-nitro-1-isoquinoline, 3,4-dihydro-1-isoquinoline, 6-nitro-3-isoquinoline)}; imidazo[4,5-b]quinoxaline nuclei (for example, 1,3-diethylimidazo[4,5-b]quinoxaline, 6-chloro-1,3-diallylimidazo[4,5-b]quinoxaline); oxadiazole nuclei; thiadiazole nuclei; tetrazole nuclei; and pyrimidine nuclei.

Preferred nuclei formed by $Z_1$, $Z_2$ or $Z_4$ are benzothiazole, naphthothiazole, benzoxazole, naphthoxazole, benzimidazole, 2-quinoline, and 4-quinoline nuclei.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$ and $V_{22}$ each is a hydrogen atom or a monovalent substituent. V groups bonded to the same carbon atom may together form a divalent substituent (e.g., $V_1$ and $V_2$ may together form an alkylidene group such as

The substituents represented by $V_1$ to $V_{22}$ include the known substituents. Preferably, the substituents include a substituted or unsubstituted alkyl group (e.g., methyl, ethyl, propyl, butyl, hydroxyethyl, trifluoromethyl, benzyl, sulfopropyl, diethylaminoethyl, cyanopropyl, adamantyl, p-chlorophenethyl, ethoxyethyl, ethylthioethyl, phenoxyethyl, carbamoylethyl, carboxyethyl, ethoxycarbonylmethyl, acetylaminoethyl), a substituted or unsubstituted alkenyl group (e.g., allyl, styryl), a substituted or unsubstituted aryl group (e.g., phenyl, naphthyl, p-carboxyphenyl, 3,5-dicarboxyphenyl, m-sulfophenyl, p-acetamidophenyl, 3-caprylamidophenyl, p-sulfamoylphenyl, m-hydroxyphenyl, p-nitrophenyl, 3,5-dichlorophenyl, p-anisyl, o-anisyl, p-cyanophenyl, p-N-methyl-ureidophenyl, m-fluorophenyl, p-tolyl, m-tolyl), a substituted or unsubstituted heterocyclic group (e.g., pyridyl, 5-mehtyl-2-pyridyl, thienyl), a halogen atom (e.g., chlorine, bromine, fluorine), a mercapto group, a cyano group, a carboxyl group, a sulfo group, a hydroxyl group, a carbamoyl group, a sulfamoyl group, an amino group, a nitro group, a substituted or unsubstituted alkoxy group (e.g., methoxy, ethoxy, 2-methoxyethoxy, 2-phenylethoxy), a substituted or unsubstituted aryloxy group (e.g., phenoxy, p-methylphenoxy, p-chlorophenoxy), an acyl group (e.g., acetyl, benzoyl), an acylamino group (e.g., acetylamino, caproylamino), a sulfonyl group (e.g., methanesulfonyl, benzenesulfonyl), a sulfonylamino group (e.g., methanesulfonylamino, benzenesulfonylamino), a substituted amino group (e.g., diethylamino, hydroxyamino), an alkylthio or arylthio group (e.g., methylthio, carboxyethylthio, sulfobutylthio, phenylthio), an alkoxycarbonyl group (e.g., methoxycarbonyl), and an aryloxycarbonyl group (e.g., phenoxycarbonyl). The substituents represented by $V_1$ to $V_{22}$ may further be substituted by one or more substituents such as an alkyl group, an alkenyl group, an aryl group, a hydroxyl group, a carboxyl group, a sulfo group, a nitro group, a cyano group, a halogen atom, an alkoxy group, an aryloxy group, an alkoxycarbonyl group, an acyl group, an acylamino group, a sulfonamido group, a carbamoyl group and a sulfamoyl group.

More preferably, they are each an unsubstituted alkyl group (e.g., methyl, ethyl) or an unsubstituted aryl group (e.g., phenyl).

$L_1$ to $L_{13}$ each represents a methine group or a substituted methine group {for example, a methine group substituted by one or more substituents selected from a substituted or unsubstituted alkyl group (e.g., methyl, ethyl, 2-carboxyethyl), a substituted or unsubstituted aryl group (e.g., phenyl, o-carboxyphenyl), a heterocyclic group (e.g., barbituric acid), a halogen atom (e.g., chlorine, bromine), an alkoxy group (e.g., methoxy, ethoxy), an amino group (e.g., N,N-diphenylamino, N-methyl-N-phenylamino, N-methylpiperazino), an alkylthio group (e.g., methylthio, ethylthio)}. The methine group may form a ring with other methine group(s), or it may form a ring with an auxochrome.

$L_1$ to $L_{13}$ are preferably an unsubstituted methine group.

$R_3$ is preferably an unsubstituted alkyl group having from 1 to 18 carbon atoms, preferably from 1 to 7 carbon atoms, especially preferably from 1 to 4 carbon atoms (e.g., methyl, ethyl, propyl, isopropyl, butyl, isobutyl, hexyl, octyl, dodecyl, octadecyl); a substituted alkyl group {for example, an aralkyl group (e.g., benzyl, 2-phenylethyl), a hydroxyalkyl group (e.g., 2-hydroxyethyl, 3-hydroxypropyl), a carboxyalkyl group (e.g., 2-carboxyethyl, 3-carboxypropyl, 4-carboxybutyl, carboxymethyl), an alkoxyalkyl group (e.g., 2-methoxyethyl, 2-(2-methoxyethoxy)ethyl), a sulfoalkyl group (e.g., 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethoxyethyl), a sulfatoalkyl group (e.g., 3-sulfatopropyl, 4-sulfatobutyl), a heterocyclic ring-substituted alkyl group (e.g., 2-(pyrrolidin-2-on-1-yl)ethyl, tetrahydrofurfuryl, 2-morpholinoethyl), 2-acetoxyethyl, carboxymethoxymethyl, 2-methanesulfonylaminoethyl, methanesulfonylcarbamoylethyl}; an allyl group; an aryl group (e.g., phenyl, 2-naphthyl); a substituted aryl group (e.g., 4-carboxyphenyl, 4-sulfophenyl, 3-chlorophenyl, 3-methylphenyl); or a heterocyclic group (e.g., 2-pyridyl, 2-thiazolyl).

More preferably, $R_3$ is an alkyl group and is especially preferably a methyl group, an ethyl group, a 2-carboxyethyl group, a carboxymethyl group, a 2-sulfoethyl group, a 3-sulfopropyl group, a 4-sulfobutyl group, a 3-sulfobutyl group, or a methanesulfonylcarbamoylmethyl group.

$D_1$ and $D_{1a}$, and $D_2$ and $D_{2a}$ each represent an atomic group necessary for forming an acidic nucleus, which may be any form of acidic nuclei of common merocyanine dyes, with the proviso that, when $D_1$ and $D_{1a}$ represent a cyclic acidic nucleus, $D_1$ and $D_{1a}$ are bonded to each other. Acidic nuclei as referred to herein are those defined by the description of James, *The Theory of the Photographic Process*, 4th Ed., page 198 (published by Macmillan Co., 1977). In their preferred form, substituents participating in their resonance of $D_1$ and $D_2$ which may be either acyclic or cyclic are, for example, a carbonyl group, a cyano group, a sulfonyl group and a sulfenyl group. $D_{1a}$ and $D_{2a}$ each is the remaining atomic group necessary for forming the acidic nuclei. (e.g., when the moiety of $D_1$ and $D_{1a}$ is

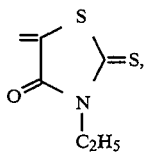

$D_1$ represents

and $D_{1a}$ represents

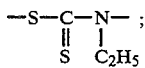

when the moiety of $D_1$ and $D_{1a}$ is

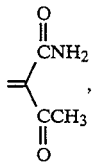

$D_1$ represents

represents

Concrete examples are disclosed in U.S. Pat. Nos. 3,567,719, 3,575,869, 3,804,634, 3,837,862, 4,002,480, 4,925,777 and JP-A-3-167546 (The term "JP-A" as used herein means an "unexamined published Japanese patent application").

When the acidic nucleus is acyclic, the terminal of the methine bond represented by $D_1$ and $D_{1a}$ or $D_2$ and $D_{2a}$ is a malononitrile group, an alkanesulfonylacetonitrile group, a cyanomethylbenzofuranylketone group, a cyanomethylphenylketone group or the like.

When $D_1$ and $D_{1a}$, and $D_2$ and $D_{2a}$ are cyclic, they may form a 5-membered or 6-membered heterocyclic group composed of carbon, nitrogen and chalcogen (typically, oxygen, sulfur, selenium and tellurium) atoms. Preferably mentioned are the following nuclei: 2-pyrazolin-5-one, pyrazolidine-3,5-dione, imidazolin-5-one, hydantoin, 2- or 4-thiohydantoin, 2-iminoxazolidin-4-one, 2-oxazolin-5-one, 2-thioxazolidine-2,4-dione, isoxazolin-5-one, 2-thiazolin-4-one, thiazolidin-4-one, thiazolidine-2,4-dione, rhodanine, thiazolidine-2,4-dione, isorhodanine, indane-1,3-dione, thiophen-3-one, thiophen-3-one-1,1-dioxide, indolin-2-one, indolin-3-one, indazolin-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinolin-4-one, 1,3-dioxane-4,6-dione, barbituric acid, 2-thiobarbituric acid, chromane-2,4-dione, indazolin-2-one, and pyrido[1,2-a]pyrimidine-1,3-dione.

Specifically, preferred are 3-alkylrhodanine, 3-alkyl-2-thioxazolidine-2,4-dione, and 3-alkyl-2-thiohydantoin nuclei.

These nuclei may be substituted on the nitrogen atom(s). Preferred substituents include, for example, a hydrogen atom and those mentioned above as preferred substituents of $R_3$.

More preferably, the substituents are unsubstituted alkyl groups (e.g., methyl, ethyl, n-propyl, n-butyl, n-pentyl, n-hexyl), carboxyalkyl groups (e.g., carboxymethyl, 2-carboxyethyl), and sulfoalkyl groups (e.g., 2-sulfoethyl).

The 5-membered or 6-membered nitrogen-containing heterocyclic ring formed by Z3 is one derived from a heterocyclic ring formed by $D_1$ and $D_{1a}$ or $D_2$ and $D_{2a}$ (e.g., a rhodanine nucleus), by removing the oxo group or thioxo group from the ring.

More preferably, it is derived from a rhodanine nucleus by removing the thioxo group therefrom.

$n_3$ is preferably 0, 1, 2 or 3.

$n_5$ is preferably 0, 1, 2 or 3.

The color sensitizing dyes to be used in the present invention also include cyanine dyes, merocyanine dyes and complex merocyanine dyes. Further, complex cyanine dyes, holopolar cyanine dyes, hemicyanine dyes, styryl dyes and hemioxonol dyes may also be used. Suitable cyanine dyes include simple cyanine dyes, carbocyanine dyes, dicarbocyanine dyes and tricarbocyanine dyes.

Methine compounds represented by formula (I) or (II) for use in the present invention are shown but not limited to the specific examples below: Compounds represented by formula (I):

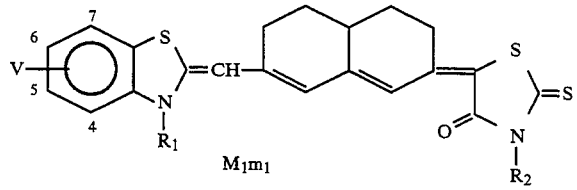

| Compound | $R_1$ | $R_2$ | V | $M_1$ | $m_1$ |
|---|---|---|---|---|---|
| (I-1) | Et | Et | H | — | — |
| (I-2) | $-(CH_2)_2OMe$ | $-CH_2CO_2H$ | 5,6-$Me_2$ | — | — |
| (I-3) | $-CH_2CO_2H$ | $-(CH_2)_2SO_3^-$ | 5,6-$(OMe)_2$ | $Na^+$ | 1 |
| (I-4) | $-(CH_2)_4SO_3^-$ | Me | 6,7-benzo | $K^+$ | 1 |
| (I-5) | $-(CH_2)_2CHMeSO_3^-$ | $-CH_2CH=CH_2$ | 4-Me | $Na^+$ | 1 |
| (I-6) | $-(CH_2)_4Me$ | $-(CH_2)_2SMe$ | 7-Me | — | — |
| (I-7) | Et | Et | 5-Cl | — | — |
| (I-8) | $-(CH_2)_2OH$ | $-(CH_2)_2OH$ | 5,6-$Cl_2$ | — | — |
| (I-9) | $-CH_2CF_2CF_2H$ | $-(CH_2)_2CO_2H$ | 5-Me | — | — |
| (I-10) | $-CH_2CONHSO_2Me$ | Me | H | — | — |
| (I-11) | $-(CH_2)_2CO_2Et$ | Ph | 5,6-$(OCH_2O)-$ | — | — |
| (I-12) | $-(CH_2)_2SO_3^-$ | 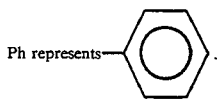 | 5-OMe | $K^+$ | 1 |
| (I-13) | $-(CH_2)_2CH_3$ | $-CH_2CO_2H$ | 6-OMe | — | — |
| (I-14) | $-(CH_2)_2O(CH_2)_2OH$ | Et | 5,6-$(SMe)_2$ | — | — |
| (I-15) | $-(CH_2)_2O-COMe$ | Et | 5-SMe | — | — |

Me represents $-CH_3$.
Et represents $-C_2H_5$.

Ph represents ⏣.

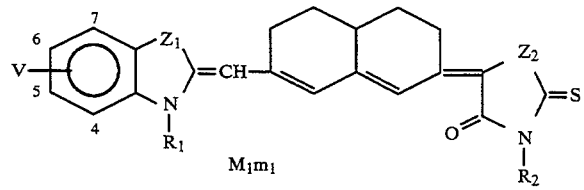

| Compound | $Z_1$ | $Z_2$ | $R_1$ | $R_2$ | V | $M_1$ | $m_1$ |
|---|---|---|---|---|---|---|---|
| (I-16) | O | S | Et | Et | H | — | — |
| (I-17) | O | O | Me | $-CH_2CO_2H$ | 5,6-$Me_2$ | — | — |
| (I-18) | N—Et | S | $-CH_2CF_2CF_2H$ | Me | 5,6-$Cl_2$ | — | — |
| (I-19) | Se | N-Et | Et | Ph | 5-Cl | — | — |
| (I-20) | Te | S | Et | Et | H | — | — |
| (I-21) | S | O | $-(CH_2)_4SO_3^-$ | $-CH_2CO_2H$ | 5-Me | $Na^+$ | 1 |
| (I-22) | N—Ph | N-Me | Et | $-(CH_2)_2OMe$ | H | — | — |
| (I-23) | O | O | $-CH_2CH=CH_2$ | $-(CH_2)_2CO_2H$ | 6,7-benzo | — | — |
| (I-24) | O | S | $-(CH_2)_2OH$ | Ph | 5-Me | — | — |
| (I-25) | O | S | $-(CH_2)_2CN$ | Me | 6-Me | — | — |

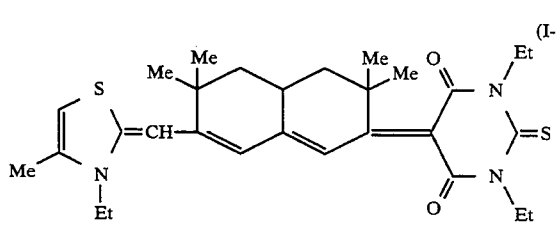

(I-26)

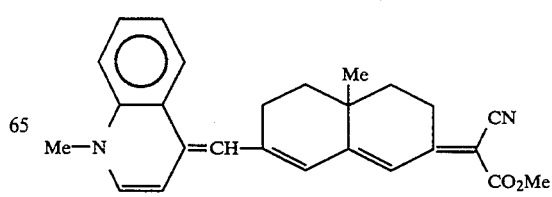

(I-27)

-continued
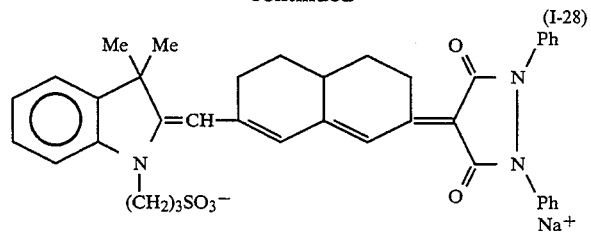
(I-28)
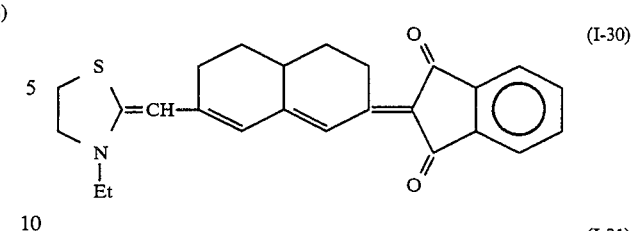
(I-30)
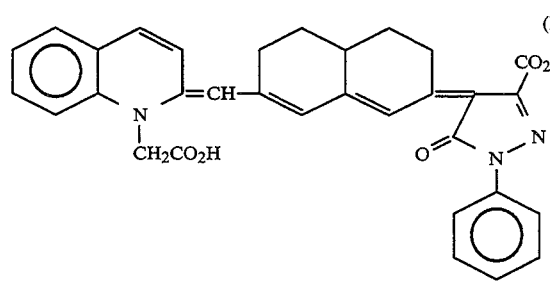
(I-29)
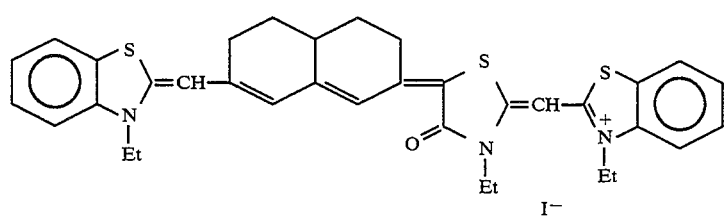
(I-31)
Compounds represented by formula (II):
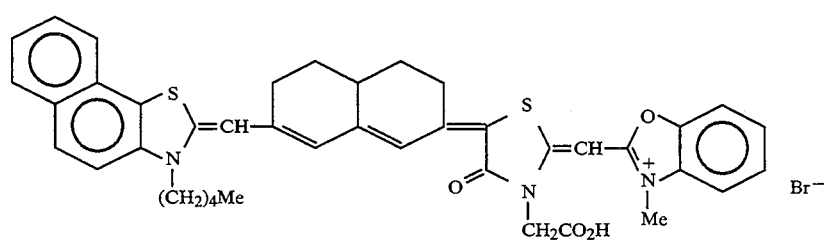
(II-1)
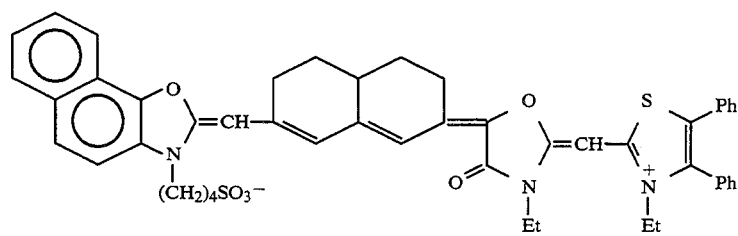
(II-2)
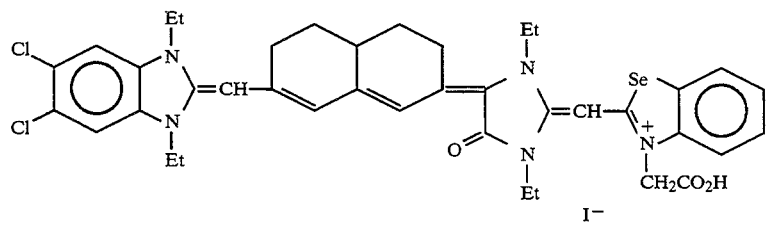
(II-3)
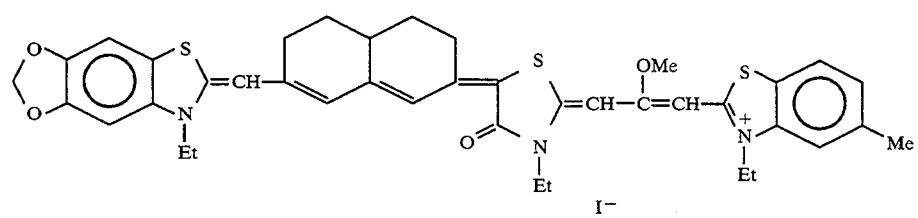
(II-4)
(II-5)

-continued
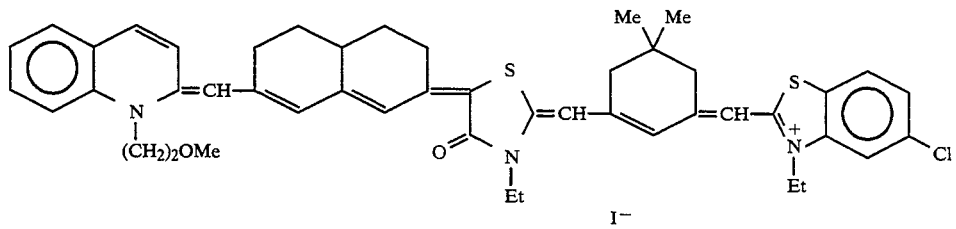
(II-6)
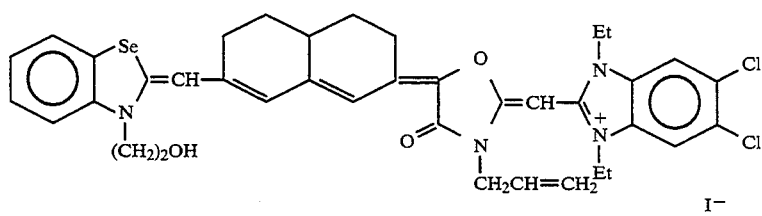
(II-7)
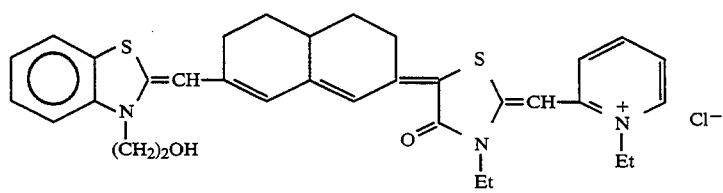
(II-8)
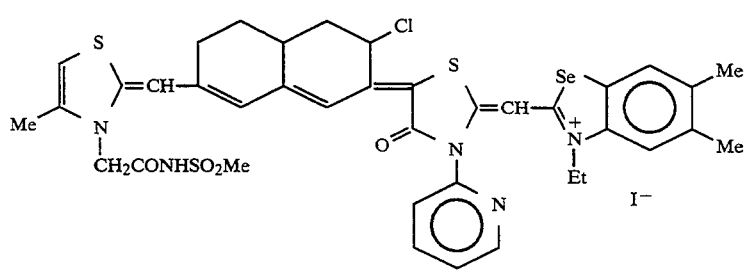
(II-9)
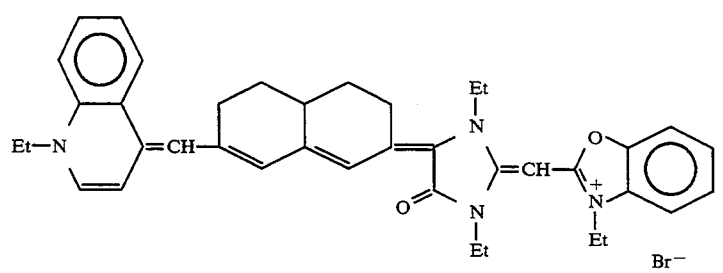
(II-10)
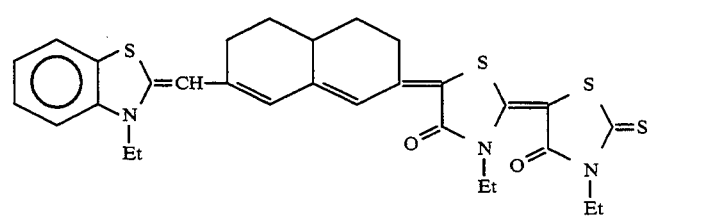
(II-11)
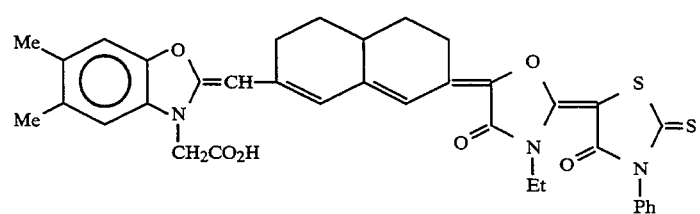
(II-12)

-continued

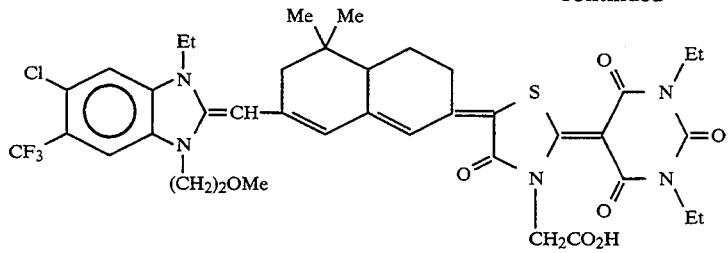
(II-13)

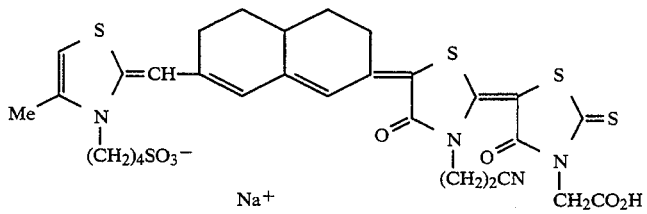
(II-14)

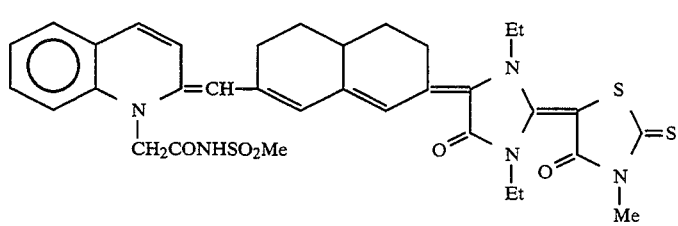
(II-15)

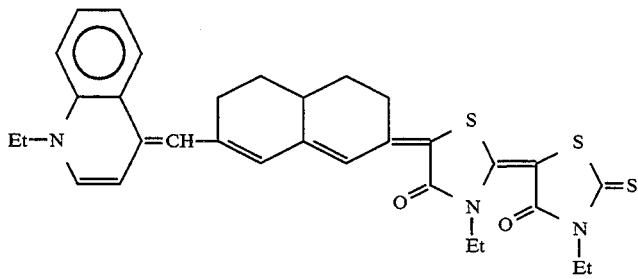
(II-16)

Methine compounds for use in the present invention can be produced by known methods, for example, by the methods described in the following references:

a) *Dokl. Akad. Nauk SSSR*, Vol. 177, page 869 (1967).

b) F. M. Harmer, *Heterocyclic Compounds—Cyanine dyes and related compounds*, (published by John Wiley & Sons Co., New York, London, 1964).

c) D. M. Sturmer, *Heterocyclic Compounds—Special topics in heterocyclic chemistry*, Chap. 8, Sec. 4, pages 482 to 515 (published by John Wiley & Sons Co., New York, London, 1977).

A production example of illustrating production of a methine compound of the present invention is shown below.

PRODUCTION EXAMPLE 1

Production of Compound (I-1)

Compound (I-1) was produced in accordance with the following reaction scheme 1, with reference to the disclosure of *Dokl. Akad. Nauk SSSR*, Vol. 177, page 869 (1967).

Reaction Scheme 1:

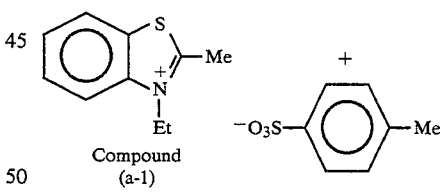

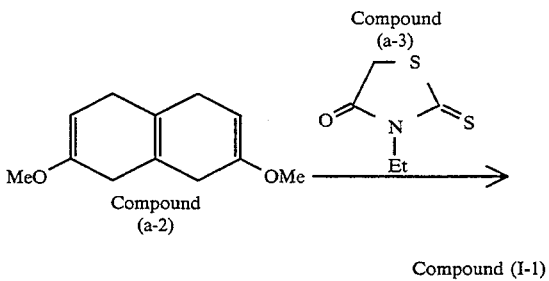

Compound (I-1)

One g of Compound (a-1) and 0.55 g of Compound (a-2) were stirred at an external temperature of 135° C. for 15 minutes. 0.46 g of Compound (a-3), 10 ml of pyridine and 1.2 ml of triethylamine were added thereto and stirred for 15 minutes at an external temperature of 100° C. 50 ml of methanol was added to the reaction solution, which was then allowed to stand at room temperature. The crystals that precipitated out were taken out by suction filtration and purified by silica gel column chromatography (eluent: ethyl acetate/hexane=½).

After the solvent was removed by distillation, a mixed solvent of chloroform/methanol (50 ml/50 ml) was added to the residue to completely dissolve it. Then, 30 ml of the solvent was removed by distillation under reduced pressure. The formed precipitates were taken out by suction filtration to obtain 0.11 g of violet crystals of Compound (I-1).

Yield: 8%
$\lambda$max (MeOH)=639 (nm)
$\epsilon=5.05\times10^4$
melting point: 234° to 236° C.

The term "$\lambda$max" and "$\epsilon$" as used herein means an "absorption maximum in methanol" and an "absorbance coefficient", respectively.

The silver halide emulsion constituting the photographic material of the present invention may have a halogen composition of silver bromide, silver iodobromide, silver iodochlorobromide, silver chlorobromide or silver chloride.

Regarding the shape of the silver halide grains constituting the silver halide emulsion of the present invention, the grains may be regular crystalline such as cubic, octahedral, tetradecahedral or rhombic dodecahedral crystalline grains, or irregular crystalline such as spherical or tabular crystalline grains, or may be composite crystalline grains composed of such regular and irregular crystalline grains. The emulsion may also be composed of grains of different crystalline forms.

The silver halide grains in the emulsion of the present invention may have different phases in the inside part (core) and the surface layer (shell) of each grain. Alternatively, they may have a uniform phase throughout the grain. The grains may be either those forming a latent image essentially on the surfaces thereof (for example, as a negative emulsion) or those forming a latent image essentially in the inside parts thereof (for example, as an internal latent image emulsion).

Preferred embodiments of the silver halide emulsion of the present invention are described below in detail.

In the present invention, a silver chlorobromide or silver chloride which does not substantially contain silver iodide is preferably used. The wording ". . . does not substantially contain silver iodide" as referred to herein means that the silver iodide content in the silver halide is 1 mol % or less, preferably 0.2 mol % or less.

Regarding the halogen composition of grains constituting an emulsion for use in the present invention, the grains may have different halogen compositions. Preferably, however, the emulsion contains grains each having the same halogen composition, as the property of the grains may easily be homogenized.

Regarding the halogen composition distribution of the grains of constituting a silver halide emulsion for use in the present invention, the grain may have a so-called uniform halogen composition structure where any part of the grain has the same halogen composition; the grain may have a so-called laminate (core/shell) structure where the halogen composition of the core of the grain is different from that of the shell of the same (monolayer or multilayer); or the grain may have a composite halogen composition structure where the inside or surface of the grain has a different non-layered halogen composition part (for example, when such a different non-layered halogen composition part is on the surface of the grain, it may be on the edge, corner or plane of the grain as a conjugated structure). Any such halogen composition may properly be selected. In order to obtain a high sensitivity photographic material, the latter laminate or composite halogen composition structure grains are advantageously employed, rather than the first uniform halogen composition structure grains. Such laminate or composite halogen composition structure grains are also preferred in view of pressure resistance. In the case of laminate or composite halogen composition structure grains, the boundary between the different halogen composition parts may be definite or may be indefinite, forming a mixed crystal structure because of the difference in the halogen compositions between the adjacent parts. If desired, the boundary between them may have a continuous structure variation.

For a photographic material for rapid processing, a so-called high silver chloride emulsion having a high silver chloride content is preferred. The silver chloride content in such a high silver chloride emulsion for use in the present invention is preferably 90 mol % or more, more preferably 95 mol % or more.

In such a high silver chloride emulsion, it is preferred that a silver bromide localized phase is in the inside and/or surface of the silver halide grain in the form of a layered or non-layered structure. The halogen composition in the localized phase is preferably such that the silver bromide content therein is 10 mol % or more, more preferably more than 20 mol %. The localized phase may be in the inside of the grain or on the edges or corners of the surface of the grain. In one preferred embodiment, the localized phase may be on the corner parts of the grain as epitaxially grown ones.

For the purpose of minimizing depression of the sensitivity of the photographic material when pressure is applied to the material, it is also preferred that the high silver chloride emulsion having a silver chloride content of 90 mol % or more in the material, contains uniform structure grains having a small halogen composition distribution in each grain.

For the purpose of reducing the amount of the replenisher to the developer for processing the photographic material, it is also effective to further elevate the silver chloride content in the silver halide emulsion constituting the material. In such a case, an emulsion of an almost pure silver chloride having a silver chloride content of 98 mol % to 100 mol % is preferably used.

The silver halide grains constituting the silver halide emulsion of the present invention preferably have a mean grain size of 0.1 μm to 2 μm. (The grain size indicates a diameter of a circle having an area equivalent to the projected area of the grain, and the mean grain size indicates a number average value to be obtained from the measured grain sizes.)

Regarding the grain size distribution of the emulsion, a so-called monodispersed emulsion having a fluctuation coefficient (obtained by dividing the standard deviation of the grain size distribution by the mean grain size) of 20% or less is preferred, more preferably it is 15% or less. For the purpose of obtaining a broad latitude, two or more monodispersed emulsions may be blended to form a mixed emulsion for one layer, or they may be separately coated to form a plurality of layers. Such blending or separate coating is preferably effected for the purpose.

Regarding the shape of the silver halide grains constituting the silver halide emulsion of the present invention, the grains may be regular crystalline grains such as cubic, tetradecahedral or octahedral crystalline grains, or irregular! crystalline grains such as spherical or tabular crystalline grains, or may be composite crystalline grains composed of such regular and irregular crystalline grains. The emulsion may also be composed of grains of different crystalline forms. Above all, the emulsion of the present invention preferably contains regular crystalline grains in a proportion of 50% or more, preferably 70% or more, more preferably 90% or more.

In addition to the above, a tabular emulsion containing tabular silver halide grains may also be employed preferably.

The tabular emulsion referred to herein indicates an emulsion containing AgX grains having an aspect ratio (circle-corresponding diameter of AgX grain/thickness of it) of 3 or more in an amount of 50% (by projected area) of all the AgX grains in the emulsion.

Preferably, the tabular emulsion is an emulsion containing AgX grains! having an aspect ratio of 5 or more, more preferably from 5 to 8, in an amount of 50% (by projected area) or more, preferably 70% or more, especially preferably 85% or more, of all the AgX grains in the emulsion.

The silver chlorobromide emulsion for use in the present invention can be produced by various known methods, for example, by the methods described in P. Glafkides, *Chemie et Physique Photographique* (published by Paul Montel, 1967); G. F. Duffin, *Photographic Emulsion Chemistry* (published by Focal Press, 1966); and V. L. Zelikman et al., *Making and Coating Photographic Emulsion* (published by Focal Press, 1964). Briefly, the known acid method, neutral method and ammonia method may be employed. As a system of reacting a soluble silver salt and soluble halide(s), the known single jet method, double jet method or a combination thereof may be employed. A so-called reverse mixing method of forming grains in an atmosphere having excess silver ions may also be employed. In one system of a double jet method, a so-called controlled double jet method of keeping the pAg value constant in the liquid phase for forming silver halide grains may also be employed. In accordance with the method, ah emulsion of silver halide grains each having a regular crystalline form and an almost uniform grain size may be obtained.

The silver halide emulsion of the present invention can contain various polyvalent metal ions, possibly introduced during formation thereof or during physical ripening thereof. Examples of suitable compounds for the purpose include salts of cadmium, zinc, lead, copper or thallium as well as salts and complexes of elements of Group VIII, such as iron, ruthenium, rhodium, palladium, osmium, iridium or platinum. In particular, the elements of Group VIII are preferred. The amount of the compounds to be added may vary broadly in accordance with the object and is preferably from $10^{-9}$ to $10^{-2}$ mol per mol of silver halide.

The silver halide emulsion of the present invention is, in general, chemically sensitized or spectrally sensitized.

For chemical sensitization, sulfur sensitization which is effected by adding an unstable sulfur compound, noble metal sensitization such as gold sensitization, or reduction sensitization, or a combination thereof. Preferred compounds to be used for such chemical sensitization are those described in JP-A-62-215272, from page 18, left bottom column to page 22, right top column.

Spectral sensitization is effected for the purpose of making the respective emulsion layers constituting the photographic material of the present invention, sensitive to a desired light wavelength range. In the present invention, a dye (or a color sensitizing dye) is preferred that is capable of absorbing light of a wavelength range corresponding to the intended color sensitivity to each emulsion. Examples of color sensitizing dyes suitable for the purpose include those as described in F. M. Harmer, *Heterocyclic Compounds—cyanine dyes and related compounds* (published by John Wiley & Sons Co., New York, London, 1964), in addition to the methine compounds of the present invention. Specific examples of preferred compounds as well as color sensitization methods are described in JP-A-62-215272, from page 22, right top column to page 38.

The silver halide emulsion of the present invention may contain various compounds., as well as precursors thereof, to prevent the fogging of photographic materials or to stabilize the photographic properties thereof during manufacture, storage or processing. Specific examples of preferred compounds are described in JP-A-62-215272, from page 39 to page 72.

The emulsion of the present invention is a so-called surface latent image type emulsion which forms a latent image essentially on the surfaces of the grains.

When a semiconductor laser is used as a light source for digital exposure of the photographic material of the present invention, infrared sensitization of the material must be effected efficiently.

Since infrared sensitization is effected by M-band sensitizing dyes, the color sensitivity distribution by infrared sensitization is generally broader than that to be effected by J-band sensitization. Therefore, it is preferred to correct or compensate the color sensitivity distribution by providing a dye-containing color colloid layer over the determined light-sensitive layer. The color layer is effective for preventing color mixing due to the filter effect.

When a methine compound of the present invention or an other color sensitizing dye is incorporated into silver halide emulsions, it may be added directly to the emulsion. Alternatively, it may be first dissolved in a single solvent or mixed solvent of water, methanol, ethanol, propanol, methyl cellosolve and/or 2,2,3,3-tetrafluoropropanol, and then added to the emulsion. In addition, it is also possible to form an aqueous solution of the dye in the presence of an acid or base, as described in JP-B-44-23389, JP-B-44-27555 and JP-B-57-22089 (The term "JP-B" as used herein means an "examined published Japanese patent application".), or to form an aqueous solution or colloidal dispersion in the presence of a surfactant as described in U.S. Pat. Nos. 3,822,135 and 4,006,025. The resulting solution or dispersion may be added to the emulsion. Further, it is possible to dissolve the dye in phenoxyethanol or a solvent which is substantially immiscible in water, and then to disperse the resulting solution in water or a hydrophilic colloid. The resulting dispersion may be added to the emulsion. Further, the dye may be dispersed directly into a hydrophilic colloid, and the resulting dispersion may be added to the emulsion, as described in JP-A-53-102733 and JP-A-58-105141. The time for adding the dye to the emulsion may be any time which has heretofore been considered suitable. Precisely, the time may be before the formation of the silver halide grains, during the formation thereof, immediately after the formation thereof to the time before the rinsing thereof, before the chemical sensitization thereof, during the chemical sensitization thereof, immediately after the chemical sensitization thereof to the time before the cooling and solidification thereof, and during the preparation of the coating composition containing them. Most often, addition of the dye is effected at any time after completion of the chemical sensitization of the emulsion but before its coating. If desired, the dye may be added to the emulsion at the same time the chemical sensitizing agent thereto is added, so as to effect color sensitization and chemical sensitization simultaneously, as described in U.S. Pat. No. 3,628,969 and 4,225,666; or color sensitization may be effected prior to chemical sensitization as described in JP-A-58-113928; or the dye may be added before completion of the formation of precipitates of silver halide grains to start the color sensitization prior to formation of the grains. In addition, it is also possible to stepwise partially add the color sensitizing dye as described in U.S. Pat. No. 4,225,666; that is, a part of the dye is added prior to chemical sensitization of the emulsion and the remaining part thereof is then added after chemical sensitization. In any event, addition of a color sensitizing dye to an emulsion may be effected at any stage of the formation of the silver halide grains of the emulsion by any known method, for example, as described in U.S. Pat. No. 4,183,756. Especially preferably, the dye is added to an emulsion before rinsing it with water or before the chemical sensitization thereof.

The amount of the color sensitizing dye to be added to the emulsion may vary broadly, and it may be preferably from $0.5 \times 10^{-6}$ mol to $1.0 \times 10^{-2}$ mol, more preferably from $1.0 \times 10^{-6}$ mol to $5.0 \times 10^{-3}$ mol, per mol of silver halide.

For red to infrared sensitization of the emulsion of the present invention by M-band type sensitization, super-color sensitization with the compounds described in JP-A-2-157749, from page 13, left bottom column, line 3 to page 22, right bottom column, line 3 from below is especially effective.

The constituents of the photographic material of the present invention are described below. The photographic material of the present invention has at least three silver halide emulsion layers on a support, at least two layers of which are desired to have a color sensitivity peak at 670 nm or more. Preferably, the light-sensitive layers each contains at least one coupler capable of coloring by a coupling reaction with an oxidation product of an aromatic amine compound. As a photographic material for full color hard copies, it is preferred that the material has at least three silver halide light-sensitive layers each having a different color sensitivity on a support and that each layer contains a yellow, magenta or cyan coupler capable of coloring by a coupling reaction with an oxidation product of an aromatic amine compound. The three kinds of different color sensitivities may freely be selected in accordance with the wavelength range of the light source to be used for digital exposure. From the viewpoint of color separation, it is desired that the nearest adjacent color sensitivity peaks are separated from each other by at least 30 nm. The relationship between the couplers (yellow (Y), magenta (M), cyan (C)) contained in each of the at least three light-sensitive layers ($\lambda 1$, $\lambda 2$, $\lambda 3$) each having a different color sensitivity peak and the corresponding three light-sensitive layers is not specifically defined. That is to say, there are six possibilities ($3 \times 2 = 6$) for each combination of coupler and layer.

The order of coating the three light-sensitive layers each having a different color sensitivity peak on the support is also not specifically defined. From the viewpoint of rapid processability, it is often preferred that a light-sensitive layer containing silver halide grains having the largest mean grain size and having the longest wave color sensitivity is the uppermost layer. Therefore, the number of possible combinations of the three kinds of different color sensitivities, the three kinds of color couplers and the position of the layers on the support is 36. The present invention may be applicable to any photographic material in these 36 ways.

In the present invention, a semiconductor laser is preferably used as a light source for digital exposure. In that case, it is preferred that at least one light-sensitive layer of at least the three silver halide emulsion layers each having a different color sensitivity has a color sensitivity peak at 730 nm or more and that at least two layers have a color sensitivity peak in a long wavelength range of 670 nm or more. Also in that case, there is no particular limitation on the color sensitivity peaks, the kinds of the color couplers, and the positions of the layers. Table 1 below shows specific examples of light sources for digital exposure of the photographic materials along with the color sensitivity peaks of the materials corresponding thereto and color couplers in the materials, which, however, are not limiting.

TABLE 1

| | Light Source for Digital Exposure | | | Color Sensitivity Peak of Photographic Material (nm) |
|---|---|---|---|---|
| | Light Source | Wavelength (nm) | Color Coupler | |
| 1 | AlGaInAs (670) | 670 | C | 670 |
| | GaAlAs (750) | 750 | Y | 730 |
| | GaAlAs (810) | 810 | M | 810 |
| 2 | AlGaInAs (670) | 670 | Y | 670 |
| | GaAlAs (750) | 750 | M | 730 |
| | GaAlAs (810) | 810 | C | 810 |
| 3 | AlGaInAs (670) | 670 | M | 670 |
| | GaAlAs (750) | 750 | C | 750 |
| | GaAlAs (830) | 830 | Y | 830 |
| 4 | AlGaInAs (670) | 670 | Y | 670 |
| | GaAlAs (780) | 780 | M | 780 |
| | GaAlAs (830) | 830 | C | 840 |
| 5 | AlGaInAs (670) | 670 | C | 670 |
| | GaAlAs (780) | 780 | M | 780 |
| | GaAlAs (880) | 880 | Y | 880 |
| 6 | GaAlAs (780) | 780 | M | 780 |
| | GaAlAs (830) | 830 | Y | 830 |
| | GaAlAs (880) | 880 | C | 880 |
| 7 | GaAs (1200) + SHG[1] | 600 | M | 600 |
| | AlGaInAs (670) | 670 | Y | 670 |
| | GaAlAs (880) | 750 | C | 750 |
| 8 | LED (580) | 580 | Y | 580 |
| | LED (670) | 670 | M | 670 |
| | LED (810) | 810 | C | 810 |

[1]SHG: Secondary higher harmonics with non-linear optical element were used.

Exposure of photographic materials of the present invention is discussed below. It is possible that the photographic material of the present invention is imagewise exposed by a scanning digital exposure system in which a high-density beam light such as a laser or LED is applied to the material by moving the beam light relative to the material. Therefore, in that case, the time during which the silver halide in the photographic material is exposed to the light is the time necessary for exposing a certain small area of the material. As the small area of the material, the minimum unit for controlling the light amount from the respective digital data is generally used, which is called a pixel (picture element). Therefore, in accordance with the size of the pixel, the exposure time per pixel varies. The size of the pixel depends upon the pixel density, which is from 50 to 2,000 dpi. The exposure time is, when it is defined to be a time of exposing the pixel size of 400 dpi as the pixel density, preferably $10^{-4}$ second or less, more preferably $10^{-6}$ second or less.

Preferably, dyes which may be decolored by photographic processing, such as those described in European Patent Publication 0,337,490A2 (pages 27 to 76), especially oxonol dyes, are added to the hydrophilic colloid layer of the photographic material of the present invention for the purpose of elevating the sharpness of the images formed in such a way that the optical reflection density of the material at 680 nm may be 0.70 or more. On titanium oxide grains, the surfaces of which have been treated with di- to tetra-hydric alcohols (for example, trimethylol ethane), are added to the water-proofing resin layer of the support in an amount of 12% by weight or more, more preferably 14% by weight or more.

The photographic material of the present invention may contain colloidal silver and dyes for the purpose of anti-irradiation and anti-halation, especially for the purpose of separation of the color sensitivity distribution of the respective light-sensitive layers and for the purpose of ensuring the safety to safelight.

Examples of dyes suitable for these purposes include: oxonol dyes having a pyrazolone nucleus, a barbituric nucleus or a barbituric acid nucleus described in U.S. Pat. Nos. 506,385, 1,177,429, 1,131,884, 1,338,799, 1,385,371, 1,467,214, 1,433,102, 1,553,516, JP-A-48-85130, JP-A-49-114420, JP-A-52-117123, JP-A-55-161233, JP-A-59-111640, JP-B-39-22069, JP-B-43-13168, JP-B-62-273527, U.S. Pat. Nos. 3,247,127, 3,469,985, 4,078,933; other oxonol dyes described in U.S. Pat. Nos. 2,533,472, 3,379,533, British Patent 1,278,621, JP-A-1-134447, JP-A-1-183652; azo dyes described in British Patents 575,691, 680,631, 599,623, 786,907, 907,125, 1,045,609, U.S. Pat. No. 4,255,326, JP-A-59-211043; azomethine dyes described in JP-A-50-100116, JP-A-54-118247, British Patents 2,014,598, 750,031; anthraquinone dyes described in U.S. Pat. No. 2,865,752; arylidene dyes described in U.S. Pat. Nos. 2,538,009, 2,688,541, 2,538,008, British Patents 584,609, 1,210,252, JP-A-50-40625, JP-A-51-3623, JP-A-51-10927, JP-A-54-118247, JP-B-48-3286, JP-B-59-37303; styryl dyes described in JP-B-28-3082, JP-B-44-16594, JP-B-59-28898; triarylmethane dyes described in British Patents 446,538, 1,335,422, JP-A-59-228250; merocyanine dyes described in British Patents 1,075,653, 1,153,341, 1,284,730, 1,475,228, 1,542,807; and cyanine dyes described in U.S. Pat. Nos. 2,843,486, 3,294,539 and JP-A-1-291247.

For the purpose of preventing diffusion of these dyes into the photographic material, the following methods may be employed. In one method, a ballast group is introduced into the dyes so that the dyes are made non-diffusive.

In another method, a hydrophilic polymer charged oppositely to the dissociated anionic dye is incorporated into the dye-containing layer as a mordant agent, whereby the dye is localized in the particular layer because of the interaction between the hydrophilic polymer and the dye molecule, as described in U.S. Pat. Nos. 2,548,564, 4,124,386 and 3,625,694.

In still another method, a water-insoluble solid dye is used for coloring a particular dye, for example, as described in JP-A-56-12639, JP-A-55-155350, JP-A-55-155351, JP-A-63-27838, JP-A-63-197943, European Patent 15,601.

In still another method, a particular layer is colored with fine grains of a metal salt to which dye grains have adsorbed, as described in U.S. Pat. Nos. 2,719,088, 2,496,841, 2,496,843, JP-A-60-45237.

The photographic material of the present invention preferably contains a color image storability improving compound, such as those described in European Patent publication 0,277,589A2, along with couplers, especially with pyrazoloazole couplers.

Specifically, incorporation of a compound (F) which may be chemically bonded to an aromatic amine developing agent which remains after color development to form a chemically inert and substantially colorless compound and/or a compound (G) which may be chemically bonded to an oxidation product of an aromatic amine developing agent which remains after color development to form a chemically inert and substantially colorless compound, in the photographic material of the present invention is preferred, for example, for the purpose of preventing formation of stains and of preventing any other unfavorable side effect caused by reaction of the remaining color developing agent or an oxidation product thereof and couplers in the photographic material during storage of the processed material.

In addition, the photographic material of the present invention also preferably contains various microbicides described in JP-A-63-271247, for the purpose of exterminating various fungi and bacteria which would propagate in the hydrophilic colloid layers and deteriorate the images formed.

As the support for the photographic material of the present invention, a white polyester support or a support coated with a white pigment-containing layer on the surface having silver halide emulsion layers thereon may be used for display of the images formed on the material. In addition, for the purpose of improving the sharpness of the images to be formed, an anti-halation layer is desired to be formed on either surface of the support. In particular, it is preferred that the transmittance density of the support is defined to fall within the range of 0.35 to 0.8 in order that the displayed images may be seen by either a reflected light or a transmitted light.

The exposed photographic material is processed by conventional black-and-white development or color development. When the material of the present invention is a color photographic material, it is desired to be first subjected to color development and then to bleach-fixation for the purpose of effecting rapid processing. In particular, when the material contains the above-mentioned high silver chloride emulsion, the pH value of the bleach-fixing solution used for processing is desired to be 6.5 or less, especially preferably 6 or less, for promoting desilvering speed.

For silver halide emulsions and other elements (additives, etc.) constituting the photographic materials of the present invention as well as the arrangement of the photographic layers (arrangement of layers, etc.) of the materials, and the processing methods and processing additives used for processing the materials, for example, disclosures of the following references, especially European Patent Publication 0,355,660A2 (corresponding to JP-A-2-139544), are cited.

| Photogrpahic Elements | JP-A-62-215272 | JP-A-2-33144 | EP 0,335,660A2 |
|---|---|---|---|
| Silver Halide Emulsions | From page 10, right upper column, line 6 to page 12, left lower column, line 5; and from page 12, right lower column, line 4 up to page 13, left upper column, line 17 | From page 28, right uppper column, line 16 to page 29, right lower column, line 11; and page 30, lines 2 to 5 | From page 45, line 53 to page 47, line 3; and page 47, lines 20 to 22 |
| Silver Halide Solvents | Page 12, left lower column, lines 6 to 14; and from page 13, left upper column, line 3 up to page 18, left lower column, last line | — | — |
| Chemical Sensitizers | Page 12, from left lower column, line 3 up to right lower column, line 5 up; and from page 18, right lower column, line 1 to page 22, right upper column, line 9 up | Page 29, right lower column, line 12 to last line | Page 47, lines 4 to 9 |
| Color Sensitizers (Color Sensitizing Methods) | From page 22, right upper column, line 8 up to page 38, last line | Page 30, left upper column, lines 1 to 13 | Page 47, lines 10 to 15 |
| Emulsion Stabilizers | From page 39, left upper column, line 1 to page 72, right upper column, last line | Page 30, from left upper column, line 14 to right upper column, line 1 | Page 47, lines 16 to 19 |
| Development Promoters | From page 72, left lower column, line 1 to page 91, right upper column, line 3 | — | — |
| Color Couplers (Cyan, Magenta and Yellow Couplers) | From page 91, right upper column, line 4 to page 121, left upper column, line 6 | From page 3, right upper column, line 14 to page 18, left upper column, last line; and from page 30, right upper column, line 6 to page 35, right lower column, line 11 | Page 4, lines 15 to 27; from page 5, line 30 to page 8, last line; page 45, lines 29 to 31 and from page 47, line 23 to page 63, line 50 |
| Coloring Enhancers | From page 121, left upper column, line 7 to page 125, right upper column, line 1 | — | — |
| Ultraviolet Absorbents | From page 125, right upper column, line 2 to page 127, left lower column, last line | From page 37, right lower column, line 14 to page 38, left upper column, line 11 | Page 65, lines 22 to 31 |
| Anti-fading Agents (Color Image Stabilizers | From page 127, right lower column, line 1 to page 137, left lower column, line 8 | From page 36, right upper column, line 12 to page 37, left upper column, line 19 | From page 4, line 30 to page 5, line 23; from page 29, line 1 to page 45, line 25; page 45, lines 33 to 40; and page 65, lines 2 to 21 |
| High Boiling Point and/or Low Boiling Point Organic Solvents | From page 137, left lower column, line 9 to page 144, right upper column, last line | from page 35, right lower column, line 14 to page 36, left upper column, line 4 up | Page 64, lines 1 to 51 |
| Dispersing Methods of Photographic Additivies | From page 144, left lower column, line 1 to page 146, right upper column, line 7 | From page 27, right upper column, line 10 to page 28, left upper column, last line; and from page 35, right lower column, line 12 to page 36, right upper column, line 7 | From page 63, line 51 to page 64, line 56 |
| Hardening Agents | From page 146, right upper column, line 8 to page 155, left lower column, line 4 | — | — |
| Devoloping Agent Precursors | Page 155, from left lower column, line 5 to right lower column, line 2 | — | — |
| Development Inhibitor Releasing Compounds | Page 155, right lower column, lines 3 to 9 | — | — |
| Supports | From page 155, right lower column, line 19, to page 156, left upper column, line 14 | From page 38, right upper column, line 18 to page 39, left upper column, line 3 | From page 66, line 29 to page 67, line 13 |
| Constitution of Photographic Layers | Page 156, from left upper column, line 15 to right lower column, line 14 | Page 28, right upper column, lines 1 to 15 | Page 45, lines 41 to 52 |
| Dyes | From page 156, right lower column, line 15 to page 184, right lower column, last line | Page 38, from left upper column, line 12 to right upper column, line 7 | page 66, lines 18 to 22 |
| Color Mixing Preventing Agents | From page 185, left upper column line 1 to page 188, right lower column, line 3 | Page 36, right lower column, lines 8 to 11 | From page 64, line 57 to page 65, line 1 |
| Gradation Adjusting Agents | Page 188, right lower column, lines 4 to 8 | — | — |
| Stain Inhibitors | From page 188, right lower column, line 9 to page 193, right lower | Page 37, from left upper column, last line to right lower column, | From page 65, line 32 to page 66, line 17 |

-continued

| Photogrpahic Elements | JP-A-62-215272 | JP-A-2-33144 | EP 0,335,660A2 |
|---|---|---|---|
| Surfactants | column, line 10 From page 201, left lower column, line 1 to page 210, right upper column, last one | line 13 From page 18, right upper column, line 1 to page 24, right lower column, last line; and page 27, from left lower column, line 10 from below to right lower column, line 9 | — |
| Fluorine-containing Compounds (as antistatic agents, coating aids, lubricants, and antiblocking agents) | From page 210, left lower column, line 1 to page 222, left lower column, line 5 | From page 25, left upper column, line 1 to page 27, right lower column, line 9 | — |
| Binders (hydrophilic colloids) | From page 222, left lower column, line 6 to page 225, left upper column, last line | Page 38, right upper column, lines 8 to 18 | Page 66, lines 23 to 28 |
| Tackifiers | From page 225, right upper column, line 1 to page 227, right upper column, line 2 | — | — |
| Antistatic Agents | From page 227, right upper column, line 3 to page 230, left upper column, line 1 | — | — |
| Polymer Latexes | From page 230, left upper column, line 2 to page 239, last line | — | — |
| Matting Agents | Page 240, from left upper column, line 1 to right upper column, last line | — | — |
| Photographic Processing Methods (Processing steps and additives) | From page 3, right upper column, line 7 to page 10, right upper column, line 5 | From page 39, left upper column, line 4 to page 42, left upper column, last line | From page 67, line 14 to page 69, line 28 |

Note:
The cited specification of JP-A-62-215272 is the one amended by the Amendement filed on March 16, 1987.

As yellow couplers, the so-called short-wave type yellow couplers described in JP-A-63-231451, JP-A-63-123047, JP-A-63-241547, JP-A-1-173499, JP-A-1-213648 and JP-A-1-250944 are also preferably employed, in addition to those mentioned above.

As cyan couplers, the 3-hydroxypyridine cyan couplers described in European Patent publication 0,333,085A2 (especially, 2-equivalentized couplers by adding a chlorinated split-off group to the illustrated 4-equivalent Coupler (42) , as well as the illustrated Couplers (6) and (9)), and the cyclic active methylene cyan couplers described in JP-A-64-32260 (especially, Couplers Nos. 3, 8 and 34 concretely illustrated therein) are also preferably employed, in addition to diphenylimidazole cyan couplers described in the above-mentioned JP-A-2-33144.

The processing temperature for processing the photographic material of the present invention with a color developer is from 20° to 50° C., preferably from 30° to 45° C. The processing time is preferably substantially within 20 seconds. The amount of the replenisher to the color developer is desired to be as small as possible. Suitably, it may be generally from 20 to 600 ml, preferably from 50 to 300 ml, more preferably from 60 to 200 ml, most preferably from 60 to 150 ml, per m² of the photographic material being processed.

In processing the photographic material of the present invention, the developing time is desired to be substantially within 20 seconds. The time of "substantially within 20 seconds" as referred to herein indicates the time from introduction of the photographic material to be developed into the developer tank to the time of transfer of the material to the next tank, including the blank transition time from the developer tank to the next tank.

The rinsing step or stabilization step for processing the developed photographic material of the present invention is desired to have a pH of 4 to 10, more preferably from 5 to 8. The temperature for the step may be determined variously in accordance with the use and characteristics of the photographic material being processed. In general, it may be from 30° to 45° C., preferably from 35° to 42° C. The processing time for the step may also be determined freely, but it is desired to be as small as possible from the viewpoint of shortening the processing time. Preferably, it may be from 10 to 45 seconds, more preferably from 10 to 40 seconds. The amount of the replenisher to the step is desired to be as small as possible from the viewpoint of reducing the running cost, reducing the amount of the waste to be drained and improving the easy handlability of the material being processed.

Concretely, the amount of the replenisher may be from 0.5 to 50 times, preferably from 2 to 15 times, of the carryover from the previous bath, per the unit area of the photographic material being processed; or it may be 300 ml or less, preferably 150 ml or less, per m² of the photographic material being processed. Replenishment may be effected either continuously or intermittently.

The liquid used in the rinsing and/or stabilizing step may be used again in the previous step. In one preferred example of the system, there is a multi-stage countercurrent system in which the overflow of the rinsing water from the rinsing step may be recirculated into the previous bleach-fixing bath and a concentrated bleach-fixing liquid is replenished to the bleach-fixing bath, so that the amount of the waste to be drained from the process may be reduced.

The drying step employable in processing the photographic material of the present invention is described below.

In order to complete photographic images by ultra-rapid processing of the present invention, the drying time is desired to be from 20 seconds to 40 seconds. As a means of shortening the drying time, for example, the amount of the hydrophilic binder such as gelatin in the photographic material is reduced, whereby the amount of the water to be introduced into the photographic material being processed may be reduced. In addition, for the purpose of reducing the amount of the water to be introduced into the photographic material being processed, the material is squeezed with squeezing rollers or rubbed with cloth immediately after being taken out of the rinsing bath so as to remove water from the material, whereby drying of the rinsed material may be promoted. Naturally, the drier may also be improved so as to shorten the drying time, for example, by elevating the drying temperature or by enhancing the drying air. In addition, the angle of the drying air to be applied to the material being processed may suitably be adjusted, or removal of the exhaust air from the drying chamber may be stopped, whereby drying of the material being processed may be promoted.

The present invention will be explained in more detail by way of the following examples, which, however, are not limiting.

EXAMPLE 1

Preparation of Emulsion A 3.3 g of sodium chloride was added to aqueous 3% lime-processed gelatin, and 3.2 ml of N,N'-dimethylimidazolidine-2-thione (aqueous 1% solution) was added thereto. An aqueous solution containing 0.2 mol of silver nitrate and an aqueous solution containing 0.2 mol of sodium chloride and 15 µg of rhodium trichloride were added to and blended with the resulting solution at 56° C. with vigorously stirring. Subsequently, an aqueous solution containing 0,780 mol of silver nitrate and an aqueous solution containing 0,780 mol of sodium chloride and 4.2 mg of potassium ferrocyanide were added and blended therewith at 56° C., also with vigorously stirring. Five minutes after completion of addition of the aqueous silver nitrate solution and the aqueous alkali halide solution, an aqueous solution containing 0,020 mol of silver nitrate and an aqueous solution containing 0.015 mol of potassium bromide, 0.005 mol of sodium chloride and 0.8 mg of potassium hexachloroiridate(IV) were added and blended therewith at 40° C. with vigorously stirring. Next, a copolymer of isobutene-monosodium maleate was added thereto for flocculation. After being washed with water, the resulting emulsion was de-salted. Further, 90.0 g of lime-processed gelatin was added thereto so that the pH and pAg values of the emulsion were adjusted to 6.2 and 6.5, respectively. In addition, $1 \times 10^{-5}$ mol/mol-Ag of a sulfur sensitizing agent (triethylthiourea), $1 \times 10^{-5}$ mol/mol-Ag of chloroauric acid and 0.2 g/mol-Ag of nucleic acid were added to the emulsion for effecting optimum chemical sensitization of the emulsion at 50° C.

From the electromicroscopic photograph of the thus obtained silver chlorobromide Emulsion (A), obtained were the shape of the grains, the grain size and the grain size distribution. All the silver halide grains of constituting the emulsion were cubic and had a mean grain size of 0.52 µm and a fluctuation coefficient of 0.08. The mean grain size was represented by the mean value of the diameter of a circle equivalent to the projected area of each grain; and the grain size distribution was represented by the value obtained by dividing the standard deviation of the respective grain sizes by the mean grain size.

Next, by measuring X-ray diffraction from the silver halide grains constituting the emulsion formed, the halogen composition of the emulsion grains was determined. Briefly, a monochromaticized CuKα ray was used as a ray source, and the diffracted angle from (200) plane was measured in detail. The diffracted line from a crystal having a uniform halogen composition gives a single peak, while the diffracted line from a crystal having a localized phase with a different composition gives a plurality peaks each corresponding to the respective compositions. From the diffracted angle thus measured, the lattice constant was calculated, on the basis of which the halogen composition of the silver halide constituting the crystal was determined. The result of testing the silver chlorobromide Emulsion (A) in this way indicated that the emulsion had a main peak for 100% silver chloride along with an additional broad diffraction pattern having a center at 70% silver chloride (30% silver bromide) with an extending skirt to about 60% silver chloride (40% silver bromide).

Formation of Photographic Material Sample (a)

One surface of a paper support as laminated with polyethylene on the both surfaces thereof was corona-discharged, and a gelatin subbing layer containing sodium dodecylbenzenesulfonate was provided thereon. In addition, a plurality of photographic layers were coated thereon to form a multi-layer color photographic paper sample having the layer constitution mentioned below. Coating compositions were prepared in the manner mentioned below.

Preparation of Coating Composition for First Layer 27.2 ml of ethyl acetate, 4.1 g of solvent (Solv-3) and 4.1 g of solvent (Solv-7) were added to 19.1 g of yellow coupler (E×Y), 4.4 g of color image stabilizer (Cpd-1) and 0.7 g of color image stabilizer (Cpd-7), and dissolved. The resulting solution was added to 185 ml of an aqueous 10% gelatin solution containing 8 ml of 10% sodium dodecylbenzenesulfonate and emulsified and dispersed to obtain an emulsified dispersion. On the other hand, an emulsion was prepared by adding the following red-sensitizing dye (Dye-1) to the silver chlorobromide Emulsion (A). The previous emulsified dispersion and the resulting emulsion were blended to obtain a coating liquid for the first layer, having the composition described below.

Other coating liquids for the second layer to seventh layer were prepared in the same manner as above. The gelatin hardening agent for each layer was 1-oxy-3,5-dichloro-s-triazine sodium salt.

Antiseptics (Cpd-10) and (Cpd-11) were added to each layer in a total amount of 25.0 mg/m² and 50.0 mg/m², respectively. The following color sensitizing dyes were used for the respective layers:

First Layer: Red-sensitive Yellow Coloring Layer (Dye-1):

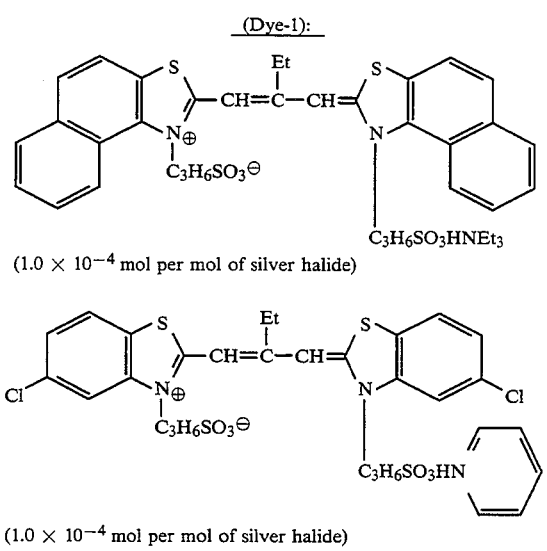

(1.0 × 10$^{-4}$ mol per mol of silver halide)

(1.0 × 10$^{-4}$ mol per mol of silver halide)

Third Layer: Infrared-sensitive Magenta Coloring Layer (Dye-2):

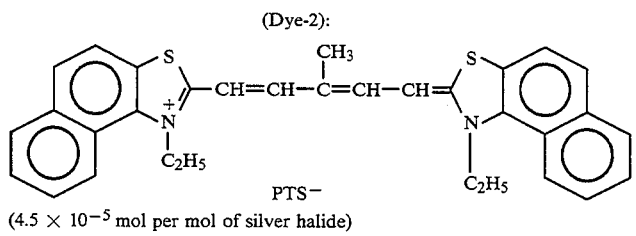

(4.5 × 10$^{-5}$ mol per mol of silver halide)

Fifth Layer: Infrared-sensitive Cyan Coloring Layer (Dye-3):

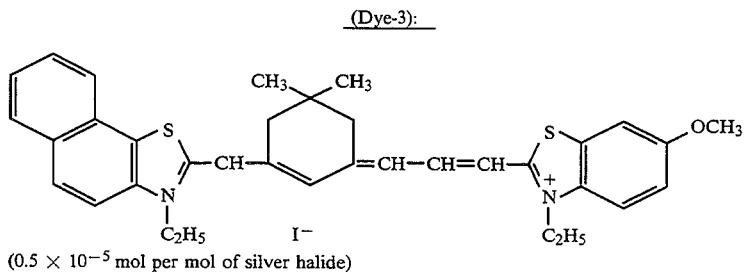

(0.5 × 10$^{-5}$ mol per mol of silver halide)

When (Dye-2) and (Dye-3) were used, the following compound was added in an amount of 1.8×10$^{-3}$ mol per mol of silver halide:

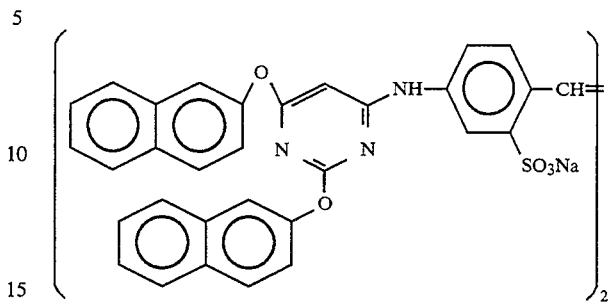

In addition, 8.0×10$^{-4}$ mol, per mol of silver halide, of 1-(5-methylureidophenyl)-5-mercaptotetrazole was added to each of the yellow coloring emulsion layer, magenta coloring emulsion layer, and cyan coloring emulsion layer.

For the purpose of anti-irradiation, the following dyes were added to the anti-irradiation emulsion layer:

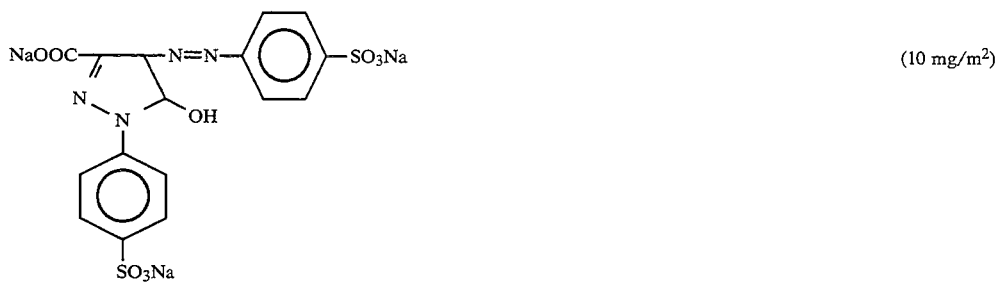

(10 mg/m$^2$)

-continued

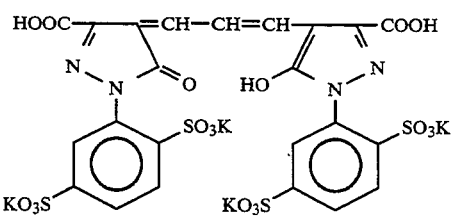 (10 mg/m²)

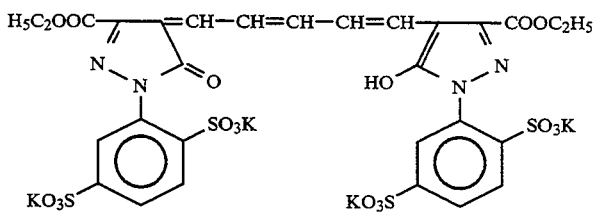 (40 mg/m²)

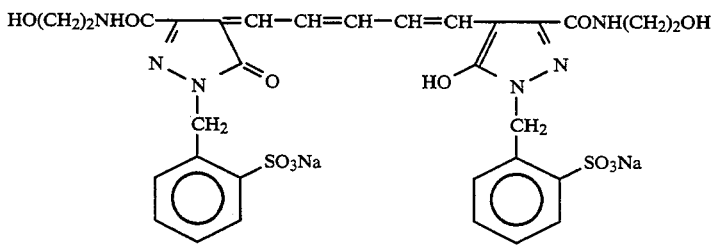 (20 mg/m²)

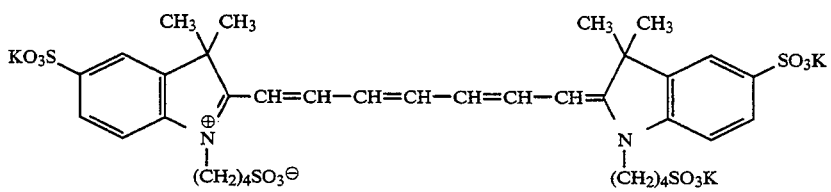 (10 mg/m²)

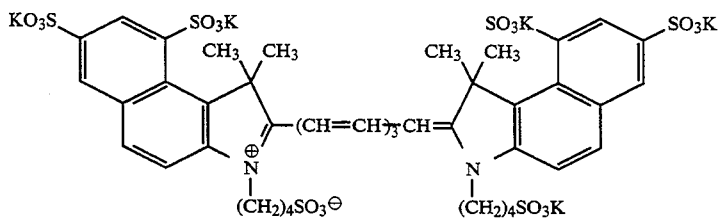 (5 mg/m²)

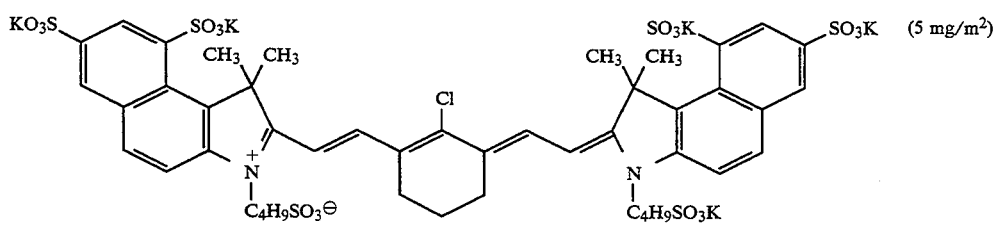 (5 mg/m²)

Constituent Layers

The composition of the constituent layers is shown below. The number indicates the amount coated as a unit of g/m². The amount of silver halide emulsion coated is represented by the amount of silver therein.

Support

Polyethylene-laminated Paper (containing white pigment (TiO₂) and bluish dye (ultramarine) in polyethylene below the first layer)

| | |
|---|---|
| First Layer: Red-sensitive Yellow Coloring Layer | |
| Above-mentioned Silver Chlorobromide Emulsion (A) | 0.30 |
| Gelatin | 1.86 |
| Yellow Coupler (ExY) | 0.82 |
| Color Image Stabilizer (Cpd-1) | 0.19 |
| Solvent (Solv-3) | 0.18 |
| Solvent (Solv-7) | 0.18 |
| Color Image Stabilizer (Cpd-7) | 0.06 |
| Second Layer: Color Mixing Preventing Layer | |
| Gelatin | 0.99 |
| Color Mixing Preventing Agent (Cpd-5) | 0.08 |
| Solvent (Solv-1) | 0.16 |
| Solvent (Solv-4) | 0.08 |

-continued

Third Layer: Infrared-sensitive Magenta Coloring Layer
| | |
|---|---|
| Silver Chlorobromide Emulsion (A) | 0.12 |
| Gelatin | 1.24 |
| Magenta Coupler (ExM) | 0.23 |
| Color Image Stabilizer (Cpd-2) | 0.03 |
| Color Image Stabilizer (Cpd 3) | 0.16 |
| Color Image Stabilizer (Cpd-4) | 0.02 |
| Color Image Stabilizer (Cpd-9) | 0.02 |
| Solvent (Solv-2) | 0.40 |

Fourth Layer: Ultraviolet Absorbing Layer
| | |
|---|---|
| Gelatin | 1.58 |
| Ultraviolet Absorbent (UV-1) | 0.47 |
| Color Mixing Preventing Agent (Cpd-5) | 0.05 |
| Solvent (Solv-5) | 0.24 |

Fifth Layer: Infrared-sensitive Cyan Coloring Layer
| | |
|---|---|
| Silver Chlorobromide Emulsion (A) | 0.23 |
| Gelatin | 1.34 |
| Cyan Coupler (ExC) | 0.32 |
| Color Image Stabilizer (Cpd-2) | 0.03 |
| Color Image Stabilizer (Cpd-4) | 0.02 |
| Color Image Stabilizer (Cpd-6) | 0.18 |
| Color Image Stabilizer (Cpd-7) | 0.40 |
| Color Image Stabilizer (Cpd-8) | 0.05 |
| Solvent (Solv-6) | 0.14 |

Sixth Layer: Ultraviolet Absorbing Layer
| | |
|---|---|
| Gelatin | 0.53 |
| Ultraviolet Absorbent (UV-1) | 0.16 |
| Color Mixing Preventing Agent (Cpd-5) | 0.02 |
| Solvent (Solv-5) | 0.08 |

Seventh Layer: Protecting Layer
| | |
|---|---|
| Gelatin | 1.33 |
| Acrylic-modified Copolymer of Polyvinyl Alcohol (modification degree 17%) | 0.17 |
| Liquid Paraffin | 0.03 |

Compounds used above are shown below.

(E×Y) Yellow Coupler

1/1 (by mol) mixture of the following compounds:

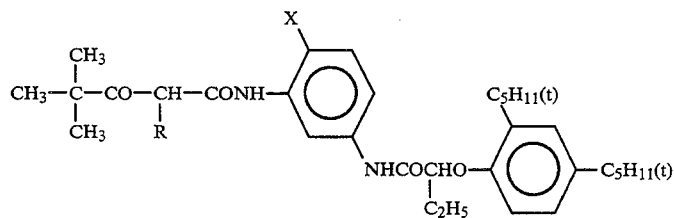

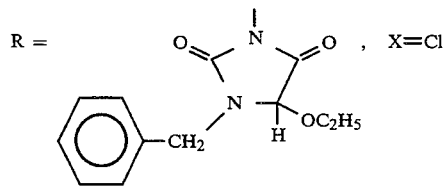

and

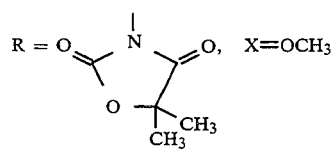

(E×M) Magenta Coupler

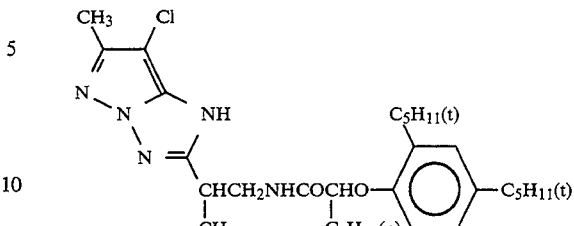

(E×C) Cyan Coupler

1/1 (by mol) mixture of the following compounds:

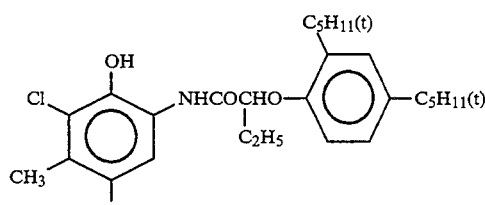

and

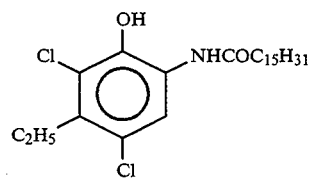

(Cpd-1) Color Image Stabilizer

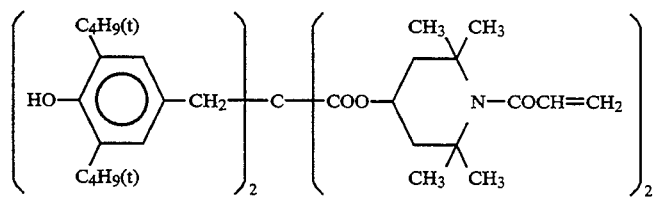
(Cpd-2) Color Image Stabilizer
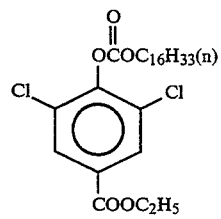
(Cpd-3) Color Image Stabilizer
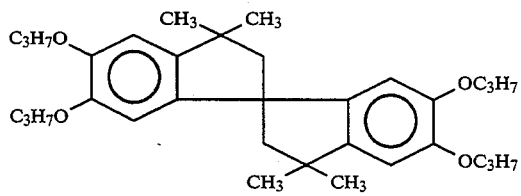
(Cpd-4) Color Image Stabilizer
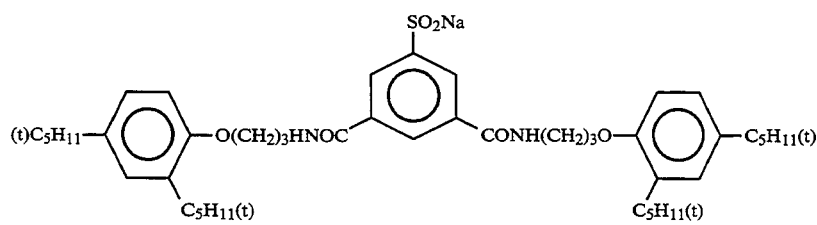
(Cpd-5) Color Mixing Preventing Agent
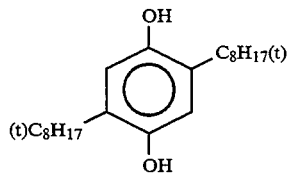
(Cpd-6) Color Image Stabilizer
2/4/4 (by weight) mixture of the following compounds:
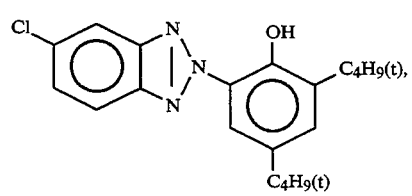
-continued
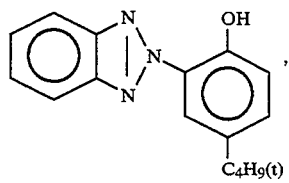
and
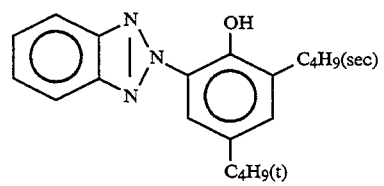
(Cpd-7) Color Image Stabilizer
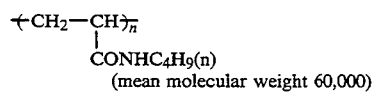
(mean molecular weight 60,000)
(Cpd-8) Color Image Stabilizer
1/1 (by weight) mixture of the following compounds:
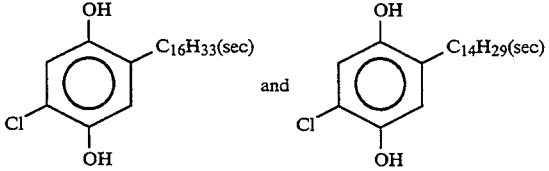

(Cpd-9) Color Image Stabilizer

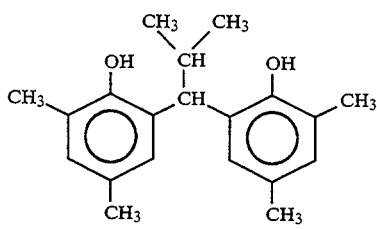

(Cpd-10) Antiseptic

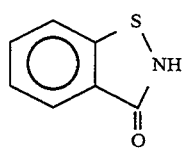

(Cpd-11) Antiseptic

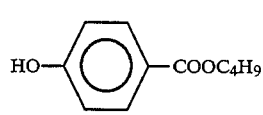

(UV-1) Ultraviolet Absorbent

4/2/4 (by weight) mixture of the following compounds:

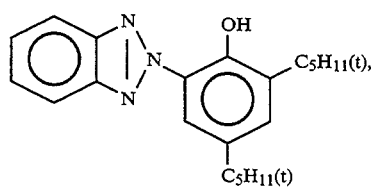

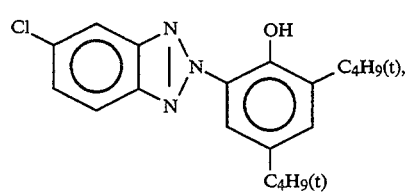

and

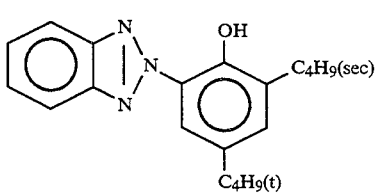

(Solv-1) Solvent

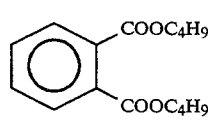

(Solv-2) Solvent

1/1 (by volume) mixture of the following compounds:

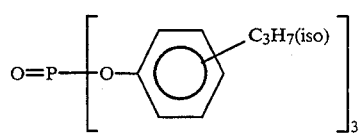

and

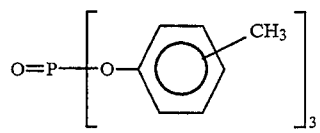

(Solv-3) Solvent

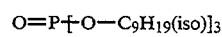

(Solv-4) Solvent

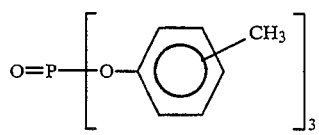

(Solv-5) Solvent

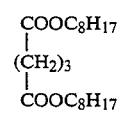

(Solv-6) Solvent

80/20 (by volume) mixture of the following compounds:

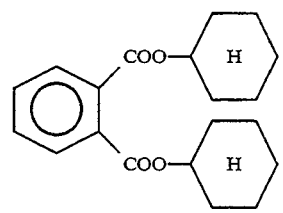

and

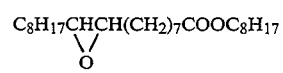

(Solv-7) Solvent

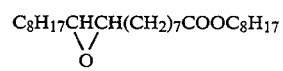

The samples identified in Table 2 below had the same layer constitution as Sample (a) prepared above, except that, in Sample Nos. 1 to 4, the color sensitizing dye in the third layer (magenta coloring layer) was replaced by the dyes shown in Table 2; and in Sample Nos. 5 to 12, the color sensitizing dye in the fifth layer (cyan coloring layer) was replaced by the dyes shown in Table 2.

the condition of an oxygen partial pressure of 10 atms at room temperature for 7 days.

These samples were then exposed, using the following two exposing devices:

(1) A sensitometer (FWH Model, manufactured by Fuji Photo Film Co., Ltd.; color temperature of light

TABLE 2

| Sample No. | Sensitizing Dye Added Compound | Amount ($\times 10^{-5}$ mol/mol-Ag) | Stored in argon at $-30°$ C. Relative Sensivity | Fog | Stored under 80% RH and 50° C. for 3 days Relative Sensitivity | Fog | Stored in oxygen partial pressure of 10 atms, for 7 days Relative Sensitivity | Remarks |
|---|---|---|---|---|---|---|---|---|
| 1 | C-1 | 1.1 | 100 (standard) | 0.03 | 76 | 0.05 | 69 | Comparison |
| 2 | I-17 | 1.1 | 120 | 0.03 | 96 | 0.05 | 93 | Invention |
| 3 | C-2 | 1.1 | 74 | 0.03 | 68 | 0.04 | 63 | Comparison |
| 4 | II-12 | 1.1 | 105 | 0.03 | 93 | 0.04 | 96 | Invention |
| 5 | C-3 | 1.1 | 100 (standard) | 0.04 | 68 | 0.04 | 66 | Comparison |
| 6 | I-1 | 1.1 | 132 | 0.04 | 96 | 0.04 | 96 | Invention |
| 7 | C-4 | 1.1 | 98 | 0.04 | 71 | 0.05 | 66 | Comparison |
| 8 | I-11 | 1.1 | 120 | 0.04 | 91 | 0.04 | 87 | Invention |
| 9 | C-5 | 1.1 | 96 | 0.03 | 68 | 0.04 | 57 | Comparison |
| 10 | I-14 | 1.0 | 115 | 0.03 | 93 | 0.03 | 87 | Invention |
| 11 | C-6 | 1.0 | 98 | 0.03 | 65 | 0.03 | 66 | Comparison |
| 12 | II-5 | 1.0 | 107 | 0.03 | 92 | 0.03 | 92 | Invention |

Comparative sensitizing dyes used above are shown below:

source, 3,200° K.) was used. Each sample was sensitometrically wedgewise exposed with the sensitometer

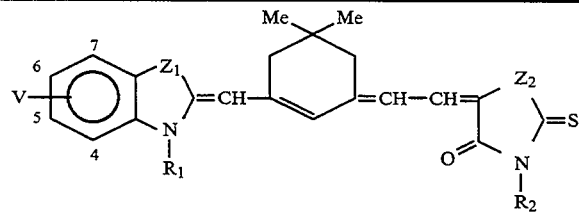

| Compound | $R_1$ | $R_2$ | $Z_1$ | $Z_2$ | V |
|---|---|---|---|---|---|
| (C-1) | Me | —CH$_2$CO$_2$H | O | O | 5,6-Me$_2$ |
| (C-3) | Et | Et | S | S | H |
| (C-4) | —(CH$_2$)CO$_2$Et | Ph | S | S | 5,6-(OCH$_2$O)— |
| (C-5) | —(CH$_2$)$_2$O(CH$_2$)$_2$OH | Et | S | S | 5,6-(SMe)$_2$ |

(C-2)

(C-6)

The coated samples were divided into three groups. The first group was hermetically sealed in an oxygen-impermeable bag, the inside atmosphere of which was substituted by argon, and stored at −30° C. The second group was stored under the conditions of 80% RH and 50° C. for 3 days. The second group was stored under for 10 seconds, via deposition interference filters of 670 nm, 750 nm and 830 nm.

(2) Semiconductor lasers AlGaInP (oscillating wavelength, about 670 nm), GaAlAs (oscillating wavelength, about 750 nm), and GaAlAs (oscillating wavelength, about 830 nm) were used. Samples to be exposed were applied to the semiconductor laser device, in which laser rays were applied to each sample for scanning exposure from a rotating polyhedral element and each sample to be exposed was moved vertically in the scanning direction. In exposing the samples with the device, the quantity of light to be applied to each sample was varied, whereupon the relation between the density (D) of the sample and the quantity of light (E) was obtained as D-logE. The quantity of light of the semiconductor laser to be applied to each sample was controlled by combination of a pulse modulation system in which the time of electrically charging the laser device was varied to modulate the quantity of light and an intensity modulation system in which the amount of electric charge to be imparted to the laser device was varied to modulate the quantity of light, whereby the exposure amount of each sample was controlled. The scanning exposure was effected at 400 dpi, whereupon the mean exposure time per pixel was about $10^{-7}$ second.

After exposure, the exposed samples were processed in the manner mentioned below.

Development of Exposed Samples

Using a paper processing machine, the exposed samples were continuously processed (running processing) in accordance with the process mentioned below, until the amount of the replenisher to the color developer tank was two times the capacity of the tank. Then, the samples were processed with the processing system after the running test.

| Processing Steps | Temperature (°C.) | Time (sec.) | Replenisher(*) (ml) | Capacity of Tank (liter) |
|---|---|---|---|---|
| Color Development | 35 | 45 | 161 | 17 |
| Bleach-fixation | 30 to 35 | 45 | 215 | 17 |
| Rinsing (1) | 30 to 35 | 20 | — | 10 |
| Rinsing (2) | 30 to 35 | 20 | — | 10 |
| Rinsing (3) | 30 to 35 | 20 | 350 | 10 |
| Drying | 70 to 80 | 60 | | |

(*)Amount of replenisher is per m² sample being processed.
(Rinsing was effected by a three-tank countercurrent system from rinsing tank (3) to rinsing tank (1).)

The processing solutions used in the above-mentioned steps had the following compositions:

| Color Developer | Tank Solution | Replenisher |
|---|---|---|
| Water | 800 ml | 800 ml |
| Ethylenediamine-N,N,N,N-tetramethylenephosphonic Acid | 1.5 g | 2.0 g |
| Potassium Bromide | 0.015 g | — |
| Triethanolamine | 8.0 g | 12.0 g |
| Sodium Chloride | 1.4 g | — |
| Potassium Carbonate | 25 g | 25 g |
| N-ethyl-N-(β-methanesulfon-Amidoethyl)-3-methyl-4-amino aniline Sulfate | 5.0 g | 7.0 g |
| N,N-bis(carboxymethyl)-hydrazine | 4.0 g | 5.0 g |
| N,N-di(sulfoethyl)hydroxyl amine/1Na | 4.0 g | 5.0 g |
| Brightening Agent (WHITEX 4B, produced by Sumitomo Chemical Co., Ltd.) | 1.0 g | 2.0 g |
| Water to make | 1000 ml | 1000 ml |
| pH (25° C.) | 10.05 | 10.45 |
| Bleach-fixing Solution: | | |
| (Tank solution and replenisher were same.) | | |
| Water | 400 ml | |
| Ammonium Thiosulfate (70%) | 100 ml | |
| Sodium Sulfite | 17 g | |
| Ammonium Ethylenediaminetetra-acetato/Iron(III) | 55 g | |
| Disodium Ethylenediaminetetraacetate | 5 g | |
| Ammonium Bromide | 40 g | |
| Water to make | 1000 ml | |
| pH (25° C.) | 6.0 | |

Rinsing Solution (Tank solution and replenisher were same.) Ion-exchanged Water (having calcium content of 3 ppm or less and magnesium content of 3 ppm or less).

The results obtained are shown in Table 2 above. The sensitivity indicates the results measured with the sensitometer. When the semiconductor lasers were used, the same results were obtained. The sensitivity is represented by the reciprocal of the amount of exposure necessary for coloring the sample to have a density composed of the coupler coloring density 0.5 plus the fog density.

The sensitivity of Sample Nos. 2, 3 and 4 stored in argon at −30° C. is represented by a relative sensitivity based on the sensitivity of Sample No. 1 being 100 (standard). The sensitivity of Sample Nos. 6 to 12 stored in argon at −30° C. is represented by a relative sensitivity based on the sensitivity of Sample No. 5 being 100 (standard).

The sensitivity of each sample stored under the condition of 85% RH and 50° C. or under the condition of an oxygen partial pressure of 10 atms is represented by a relative sensitivity based on the sensitivity of each sample in argon (−30° C.) being 100 (standard).

EXAMPLE 2

The same samples as those in Example 1 were processed with the same automatic developing machine in accordance with process (II) mentioned below, and the processed samples were tested in the same manner as in Example 1. The same results as those in Example 1 were obtained.

Development Process (II) of Photographic Material Samples

Using the same automatic developing machine as that used in Example 1, the samples were processed in accordance with the following process (II):

| Development Process (II) | | |
|---|---|---|
| Processing Steps | Temp. | Time |
| Color Development | 38° C. | 20 sec |
| Bleach-fixation | 38° C. | 20 sec |
| Rinsing (1) | 38° C. | 7 sec |
| Rinsing (2) | 38° C. | 7 sec |
| Rinsing (3) | 38° C. | 7 sec |
| Rinsing (4) | 38° C. | 7 sec |
| Rinsing (5) | 38° C. | 7 sec |
| Drying | 65° C. | 15 sec |

Rinsing was effected by five-tank countercurrent system from rinsing tank (5) to rinsing tank (1).

The processing time for each step in the above-mentioned process (II) indicates the time from introduction of the sample being processed into one processing bath to the time of introduction of the same to the next processing bath, including the blank time between the two bathes. The proportion of the blank time to the processing time varies, generally depending upon the size of the processing machine. In the present example, the proportion was within the range of 5 to 40%.

The processing solutions used in the above-mentioned steps had the following compositions:

| Color Developer | Tank Solution | Replenisher |
|---|---|---|
| Water | 700 ml | 700 ml |
| Sodium Triisopropylnaphthalene-(β)sulfonate | 0.1 g | 0.1 g |
| Ethylenediaminetetraacetic Acid | 3.0 g | 3.0 g |
| Disodium 1,2-Dihydroxybenzene-4,6-disulfonate | 0.5 g | 0.5 g |
| Triethanolamine | 12.0 g | 12.0 g |
| Potassium Chloride | 6.5 g | none |
| Potassium Bromide | 0.03 g | none |
| Sodium Sulfite | 0.1 g | 0.1 g |
| Potassium Carbonate | 27.0 g | 27.0 g |
| 4-Amino-N-ethyl-N-(3-hydroxypropyl)-3-methylaniline | 12.8 g | 27.8 g |
| Disodium N,N-bis(sulfonatoethyl)hydroxylamine | 10.0 g | 13.0 g |
| Brightening Agent (UVITEX-CK, by Ciba-Geigy, A.G.) | 2.0 g | 6.0 g |
| Water to make | 1000 ml | 1000 ml |
| pH (25° C.) | 10.05 | 10.95 |

The amount of the replenisher to the color developer bath was 35 ml per m² of the photographic material sample being processed.

| Bleach-fixing Solution | Tank Solution | Replenisher |
|---|---|---|
| Water | 400 ml | 400 ml |
| Ammonium Thiosulfate (700 g/liter) | 100 ml | 250 ml |
| Ethylenediaminetetraacetic Acid | 3.4 g | 8.5 g |
| Ammonium Ethylenediaminetetraacetato/Iron(III) Dihydrate | 73.0 g | 183 g |
| Ammonium Sulfite | 40 g | 100 g |
| Ammonium Bromide | 20.0 g | 50.0 g |
| Nitric Acid (67%) | 9.6 g | 24 g |
| Water to make | 1000 ml | 1000 ml |
| pH (25° C.) | 5.80 | 5.10 |

The amount of the replenisher to the bleach-fixing bath was 35 ml per m² of the photographic material sample being processed.

Rinsing Solution

Ion-exchanged water was used as both the tank solution and the replenisher; and the amount of the replenisher to the bath was 60 ml/m².

EXAMPLE 3

The same test as that in Example 1 was repeated, using the same photographic material samples and the same automatic developing machine, except that the samples were processed in accordance with process (III) mentioned below. The same results as those in Example 1 were obtained.

Development Process (III) of Photographic Material Samples

| Processing Steps | Temp. (°C.) | Time (sec.) | Amount of Replenisher per m² of Sample (ml) |
|---|---|---|---|
| Color Development | 38.5 | 45 | 35 |
| Bleach-fixation | 38 | 20 | 35 |
| Rinsing (1) | 38 | 12 | |
| Rinsing (2) | 38 | 12 | |
| Rinsing (3) | 38 | 12 | 105 |
| Drying | 65 | 15 | |

Rinsing was effected by a three-tank countercurrent system from rinsing tank (3) to rinsing tank (1).

The processing solutions used in the above-mentioned steps had the following compositions:

| Color Developer: | Tank Solution | Replenisher |
|---|---|---|
| Water | 700 ml | 700 ml |
| Sodium Triisopropylnaphthalene (β)sulfonate | 0.1 g | 0.1 g |
| Ethylenediaminetetraacetic Acid | 3.0 g | 3.0 g |
| Disodium 1,2-Dihydroxybenzene-4,6-disulfonate | 0.5 g | 0.5 g |
| Triethanolamine | 12.0 g | 12.0 g |
| Potassium Chloride | 6.5 g | none |
| Potassium Bromide | 0.03 g | none |
| Potassium Carbonate | 27.0 g | 27.0 g |
| Sodium Sulfite | 0.1 g | 0.1 g |
| Disodium N,N-bis(sulfonatoethyl)hydroxylamine | 10.0 g | 13.0 g |
| N-Ethyl-N-(β-methanesulfonamidoethyl)-3-methyl-4-aminoaniline Sulfate | 5.0 g | 11.5 g |
| Brightening Agent (UVITEX-CK, by Ciba-Geigy, A.G.) | 2.0 g | 6.5 g |

The bleach-fixing solution and the rinsing solution used in process (III) were the same as those used in Example 1. The other conditions for the development were same as those in Example 1, unless otherwise specifically indicated herein.

EXAMPLE 4

The compounds indicated in Table 3 below were added, at 40° C., to a tabular silver iodobromide emulsion (mean diameter, 0.82 μm; mean aspect ratio of diameter/thickness, 11.2; pAg 8.2; pH 6.5) as prepared in accordance with the method described in Example 1 of JP-A-60-131533, the emulsion having been sensitized by gold/sulfur sensitization. As a gelatin hardening agent, sodium salt of 2,4-dichloro-6-hydroxy-1,3,5-triazine was added thereto. The resulting composition was coated on a cellulose triacetate support to form an emulsion layer thereupon, whereupon a protecting layer consisting essentially of gelatin containing a surfactant and the above-mentioned gelatin hardening agent was simultaneously coated over the emulsion layer.

Samples thus coated were divided into three groups. The first group was stored at −30° C. for one year, and the second group was stored under atmospheric conditions for one year. The third group was stored at −30°

C. and then stored under the conditions of 80% RH and 50° C. for the last three days before exposure. All the groups of the samples were sensitometrically exposed with a sensitometer (FWH Model, manufactured by Fuji Photo Film Co., Ltd.; equipped with ultraviolet absorbing filter and tungsten light source with color temperature of 2,854° K.) through a sharp-cut filter of transmitting a light having a longer wavelength than 520 nm. The exposed samples were then developed with the developer mentioned below, and bleached, rinsed in water and dried.

The thus processed samples were measured with a densitometer (manufactured by Fuji Photo Film Co., Ltd.) to obtain fog density and sensitivity values. The sensitivity is represented by the reciprocal of the quantity of light necessary for giving a density of (fog density+0.2). The results obtained are shown in Table 3 below. In that table, the sensitivity of each sample stored at −30° C. is represented by a relative sensitivity based on the sensitivity of Sample No. 1 being 100 (standard); and the sensitivity of each sample stored under 80% RH and 50° C. or under natural conditions is represented by a relative sensitivity based on the sensitivity of each sample stored at −30° C. being 100 (standard).

| Composition of Developer: | |
|---|---|
| Metol | 2.5 g |
| -continued | |
| Composition of Developer: | |
| L-Ascorbic Acid | 10.0 g |
| Potassium Bromide | 1.0 g |
| Nabox | 35.0 g |
| Water to make | 1.0 liter |
| | (pH 9.8) |

As is noted from the results in Table 3 below, the photographic materials each containing the methine compound of the present invention had a high sensitivity and were almost free from fluctuation of the sensitivity, even when stored under various conditions.

TABLE 3

| Sample No. | Polymethine Dye Added | | Stored at −30° C. | | Stored under 80% RH and 50° C. for 3 days | | Stored under Atmospheric Condition for 1 year | | Remarks |
|---|---|---|---|---|---|---|---|---|---|
| | Compound | Amount ($\times 10^{-5}$ mol/mol-Ag) | Relative Sensitivity | Fog | Relative Sensitivity | Fog | Relative Sensitivity | Fog | |
| 1 | C-7 | 1.0 | 100 (standard) | 0.02 | 78 | 0.02 | 76 | 0.02 | Comparison |
| 2 | I-1 | 1.0 | 123 | 0.02 | 96 | 0.02 | 96 | 0.02 | Invention |
| 3 | C-8 | 1.0 | 102 | 0.02 | 76 | 0.04 | 76 | 0.03 | Comparison |
| 4 | I-8 | 1.0 | 115 | 0.02 | 93 | 0.03 | 91 | 0.02 | Invention |
| 5 | C-9 | 1.0 | 76 | 0.02 | 76 | 0.02 | 76 | 0.02 | Comparison |
| 6 | II-1 | 1.0 | 105 | 0.02 | 93 | 0.02 | 89 | 0.02 | Invention |

Comparative compounds used above are shown below:

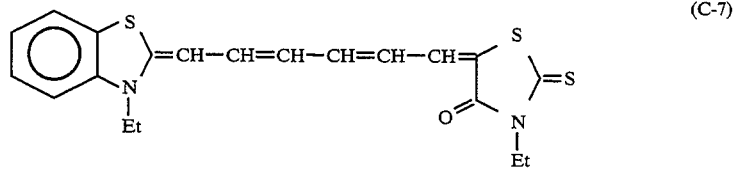

(C-7)

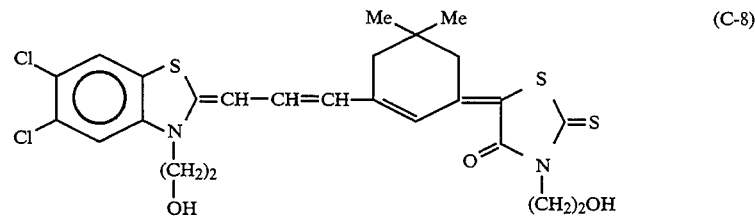

(C-8)

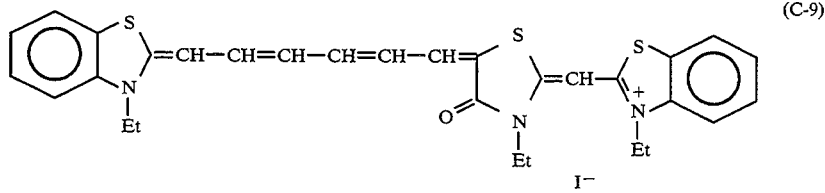

(C-9)

EXAMPLE 5

A cubic silver bromide emulsion was prepared in accordance with the method of Example 1 of JP-A-1-223441. The silver bromide grains in the emulsion prepared were monodisperse having a mean side length of 0.74 μm and having a fluctuation coefficient of 10.6%. The emulsion was adjusted to have a pH of 6.3 and a pAg of 8.4 at 4020 C. and ripened with chloroauric acid and sodium thiosulfate at 55° C. for optimum gold/sulfur sensitization.

Next, a compound indicated in Table 4 below was added thereto at 40° C.; and 0.1 g, per kg of emulsion, of sodium 2-hydroxy-4,6-dichloro-1,3,5-triazine and 0.1 g, per kg of emulsion, of sodium dodecylbenzenesulfonate were added thereto. The resulting composition was coated on a polyethylene terephthalate film base along with a protecting layer, in the same manner as in Example 4.

The coated samples thus prepared were divided into three groups. The first group was stored at −30° C. for 3 days, the second group was stored under conditions of 80% RH and 50° C. for 3 days, and the third group was stored under the conditions of an oxygen partial pressure of 10 atms at room temperature for 3 days. The thus stored samples were then sensitometrically exposed and developed in the same manner as in Example 4, and the sensitivity of each of the processed samples was obtained. The sensitivity is represented by the reciprocal of the quantity of light needed for giving a density of (fog density+0.2). The results obtained are shown in Table 4 below. In this, the sensitivity of each sample as stored at −30° C. is represented by a relative value to the sensitivity of Sample No. 1 being 100 (as standard). The sensitivity of each sample stored under 80% RH and 50° C. or under an oxygen partial pressure of 10 atms was represented by a relative value to the sensitivity of the corresponding sample stored at −30° C. being 100.

TABLE 4

| Sample No. | Dye(s) Added Compound(s) | Amount ($\times 10^{-4}$ mol/mol-Ag) | Stored at −30° C. | Relative Sensitivity Stored at 80% RH and 50° C. for 3 days | Stored under oxygen partial pressure of 10 atms for 3 days | Remarks |
|---|---|---|---|---|---|---|
| 1 | C-3 | 0.45 | 100 (standard) | 72 | 72 | Comparison |
| 2 | I-1 | 0.45 | 123 | 89 | 89 | Invention |
| 3 | I-1 | 0.45 | 141 | 96 | 98 | Invention |
|   | V-1 | 3.0 |   |   |   |   |
| 4 | C-10 | 0.05 | 96 | 60 | 58 | Comparison |
| 5 | C-10 | 0.05 | 98 | 62 | 60 | Comparison |
|   | V-2 | 3.0 |   |   |   |   |
| 6 | II-2 | 0.05 | 120 | 89 | 87 | Invention |
| 7 | II-2 | 0.05 | 141 | 96 | 93 | Invention |
|   | V-2 | 3.0 |   |   |   |   |
| 8 | C-11 | 0.07 | 102 | 59 | 59 | Comparison |
| 9 | C-11 | 0.07 | 105 | 66 | 63 | Comparison |
|   | IV-1 | 3.4 |   |   |   |   |
| 10 | I-19 | 0.07 | 123 | 91 | 91 | Invention |
| 11 | I-19 | 0.07 | 148 | 96 | 96 | Invention |
|   | IV-1 | 3.4 |   |   |   |   |

Comparative compounds used above are shown below:

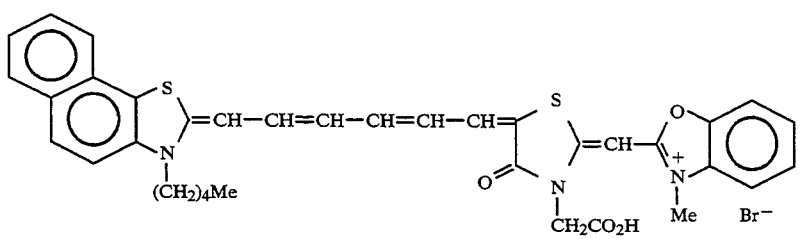

(C-10)

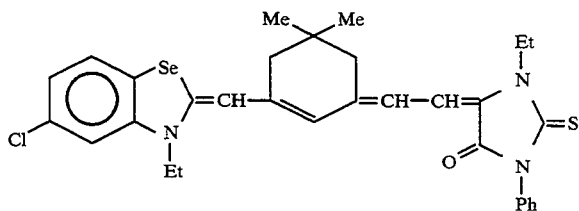

(C-11)

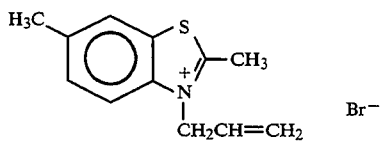

(V-1)

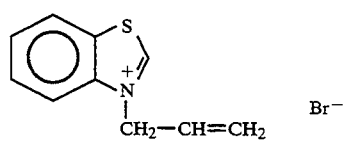

(V-2)

-continued

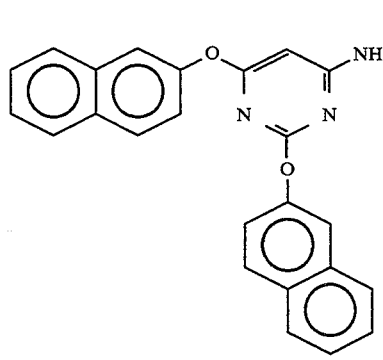 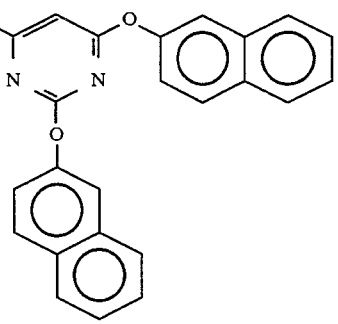

(IV-1)

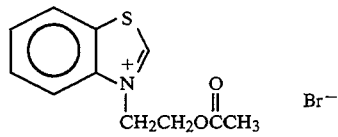

(V-3)

From the results in Table 4 above, it is understood that the photographic materials each containing a methine compound of the present invention have a high sensitivity and that the sensitivity of the samples of the present invention hardly lowers even when they are stored under the indicated conditions. When Compound (V-1) or (V-2) is incorporated into the sample along with the methine compound of the present invention, the sensitivity of the sample is further elevated and a decrease of sensitivity under storage thereof in high-temperature and high-humidity conditions of 80% RH and 50° C. is much reduced (Samples Nos. 3 and 7). With respect to Sample No. 11 containing Compound (IV-1) along with the methine compound of the present invention, it is noted that the decrease of the sensitivity of Sample No. 11 under storage thereof in high-temperature and high-humidity conditions of 80% RH and 50° C. or in an oxygen partial pressure of 10 atms is much smaller than that of the sensitivity of Sample No. 10 not containing Compound (IV-1) under the same conditions. The same result was also obtained when Compound (V-3) was used in place of Compound (V-2). The effect of such compounds may also be expressed with polymethine dyes other than the dyes of the present invention. When such compounds are combined with the polymethine dyes of the present invention, the sensitivity of the photographic materials containing them is much elevated and a decrease of the sensitivity of the various materials may effectively be prevented under storage conditions.

EXAMPLE 6

An aqueous solution containing one kg of $AgNO_3$ and an aqueous solution containing 161 g of KBr and 205 g of NaCl were simultaneously added to an aqueous solution containing 72 g of gelatin and 16 g of NaCl, both at a constant rate over a period of 32 minutes (Br=23 mol %).

During addition, rhodium chloride and $K_3IrCl_6$ were added to the reaction system each in an amount of $5 \times 10^{-7}$ mol/mol-Ag, over a period of 10 minutes of the former half time. Next, soluble salts were removed and gelatin was added. Next, the emulsion was adjusted to have a pH of 6.0 and a pAg of 7.5, and chloroauric acid and sodium thiosulfate were added thereto for chemical sensitization at 60° C. The time of chemical sensitization was such as to give the highest sensitivity to the resulting emulsion. To the emulsion were added 4-hydroxy-6-methyl-1,3,3a,7-tetrazaindene as a stabilizer and phenoxyethanol as an antiseptic.

One kg of the emulsion thus prepared was weighed; and 110 ml of a 0.05% solution of a sensitizing dye of formula (I) or (II) as indicated in Table 5 below, 60 ml of a 0.5% methanol solution of (V-1), 35 ml of a 0.5% methanol solution of (V-2) and 42 ml of a 0.5% methanol solution of (IV-1) were added thereto. Then, 100 mg/m² of hydroquinone, 25% of polyethyl acrylate latex relative to gelatin binder (as plasticizer), and 85 mg/m² of 2-bis(vinylsulfonylacetamido)ethane (as hardening agent) were added thereto. The resulting composition was coated on a polyester support in an amount of 3.7 g/m² as Ag. The amount of gelatin coated was 2.0 g/m².

Over the emulsion layer thus coated, a protecting layer was coated, which comprised 0.8 g/m² of gelatin, 40 mg/m² of polymethyl methacrylate (as mat agent; having a mean grain size of 2.5 μm), 30 mg/m² of colloidal silica (having a mean grain size of 4 μm), 80 mg/m² of silicone oil, 80 mg/m² of sodium dodecylbenzenesulfonate (as coating aid), a surfactant of $C_8F_{17}SO_2N(C_3H_7)$—$CH_2COOK$, 150 mg/m² of polyethyl acrylate latex, and 6 mg/m² of 1,1'-bisulfobutyl-3,3,3',3'-tetramethyl-5,5'-disulfoindotricarbocyanine potassium salt.

The back surface of the polyester support was coated with a backing layer and a backing layer protecting layer, each having the composition mentioned below:

| Backing Layer: | |
| --- | --- |
| Gelatin | 2.4 g/m² |
| Sodium Dodecylbenzenesulfonate | 60 mg/m² |
| Dye (2) | 80 mg/m² |
| Dye (3) | 30 mg/m² |
| 1,1'-Disulfobutyl-3,3,3'3'-tetra-methyl-5,5'-disulfoindotricarbocyanine Potassium Salt | 80 mg/m² |
| 1,3-Divinylsulfonyl-2-propanol | 60 mg/m² |
| Potassium Polyvinylbenzenesulfonate | 30 mg/m² |
| Backing Layer Protecting Layer: | |
| Gelatin | 0.75 mg/m² |
| Polymethyl Methacrylate (mean grain size 3.5 μm) | 40 mg/m² |
| Sodium Dodecylbenzenesulfonate | 20 mg/m² |
| Surfactant $C_8F_{17}SO_2N(C_3H_7)$—$CH_2COOK$ | 2 mg/m² |

| -continued | |
|---|---|
| Silicone Oil | 100 mg/m² |

Dyes (2) and (3) used above are shown below:

Dye (2):

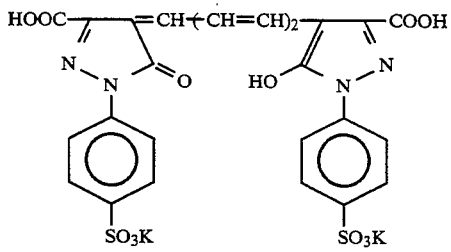

Dye (3):

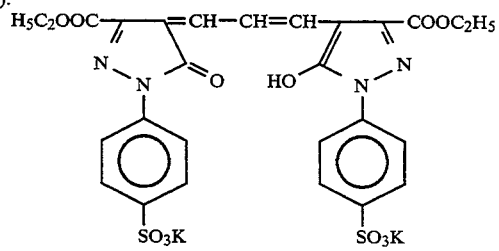

The samples thus prepared were divided into three groups. The first group was stored at −30° C. for one year, and the second group was stored under atmospheric conditions for one year. The third group was stored at −30° C., but under the conditions of 80% RH and 50° C. for the last three days of that year before exposure. The samples were sensitometrically exposed by scanning exposure with a semiconductor laser of emitting a light of 780 nm. They were developed at 38° C. for 14 seconds, then fixed, rinsed in water and dried with an automatic developing machine (FG-310PTS Model, manufactured by Fuji Photo Film Co., Ltd.), using the developer and fixer mentioned below.

The sensitivity of each sample was obtained as the reciprocal of the exposure amount giving a density of 3.0. The results obtained are shown in Table 5 below. In this table, the sensitivity of each sample stored at −30° C. is represented by a relative value to the standard sensitivity (100) of Sample No. 1. The sensitivity of each sample stored under 80% RH and 50° C. or under natural conditions was represented by a relative value to the sensitivity of the corresponding sample stored at −30° C. of being 100.

| Composition of Developer: | |
|---|---|
| Water | 720 ml |
| Disodium Ethylenediaminetetraacetate | 4 g |
| Sodium Hydroxide | 44 g |
| Sodium Sulfite | 45 g |
| 2-Methylimidazole | 2 g |
| Sodium Carbonate | 26.4 g |
| Boric Acid | 1.6 g |
| Potassium Bromide | 1 g |
| Hydroquinone | 36 g |
| Diethylene Glycol | 39 g |
| 5-Methylbenzotriazole | 0.2 g |
| Pyrazolone | 0.7 g |
| Water to make | 1 liter |
| Composition of Fixer: | |
| Ammonium Thiosulfate | 170 g |
| Sodium Sulfite Anhydride | 15 g |
| Boric Acid | 7 g |
| Glacial Acetic Acid | 15 ml |
| Potassium Alum | 20 g |
| Ethylenediaminetetraacetic Acid | 0.1 g |
| Tartaric Acid | 3.5 g |
| Water to make | 1 liter |

TABLE 5

| | Polymethine Dye Added | | Stored at −30° C. | | Stored at 80% RH and 50° C. for 3 days | | Stored under atmospheric condition for one year | | |
|---|---|---|---|---|---|---|---|---|---|
| Sample No. | Compound | Amount (×10⁻⁵ mol/mol-Ag) | Relative Sensitivity | Fog | Relative Sensitivity | Fog | Relative Sensivity | Fog | Remarks |
| 1 | C-12 | 70 | 100 (standard) | 0.02 | 72 | 0.02 | 71 | 0.02 | Comparison |
| 2 | I-1 | 70 | 129 | 0.02 | 93 | 0.02 | 93 | 0.02 | Invention |
| 3 | C-13 | 1.0 | 102 | 0.02 | 71 | 0.04 | 72 | 0.03 | Comparison |
| 4 | I-26 | 1.0 | 132 | 0.02 | 89 | 0.03 | 89 | 0.02 | Invention |
| 5 | C-14 | 1.0 | 72 | 0.02 | 69 | 0.02 | 71 | 0.02 | Comparison |
| 6 | II-11 | 1.0 | 107 | 0.02 | 87 | 0.02 | 89 | 0.02 | Invention |

Comparative compounds used above are shown below:

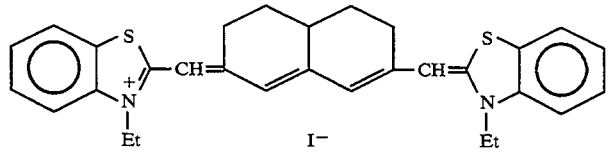

(C-12)

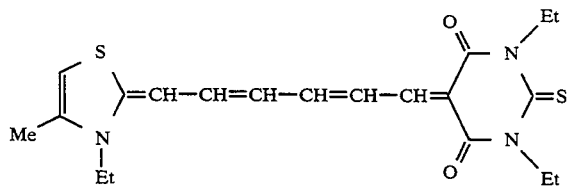

(C-13)

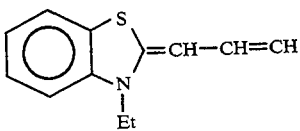

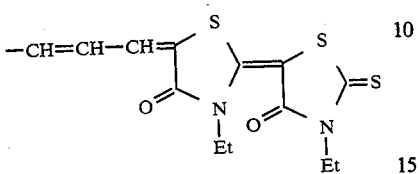

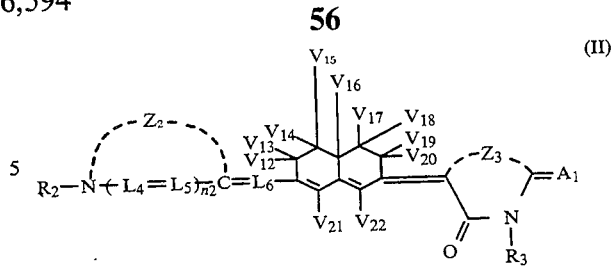

wherein $A_1$:

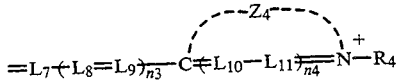

or

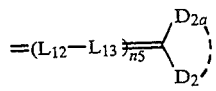

From the results in Table 5 above, it is noted that the photographic materials containing the sensitizing dye of the present invention have a high sensitivity and a high storage stability.

As have been explained in detail in the above, the methine compounds of the present invention each have a high sensitivity and are extremely stable even when they are stored under severe conditions.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a light-sensitive silver halide emulsion layer spectrally sensitized with a spectral sensitizing dye represented by a formula (I):

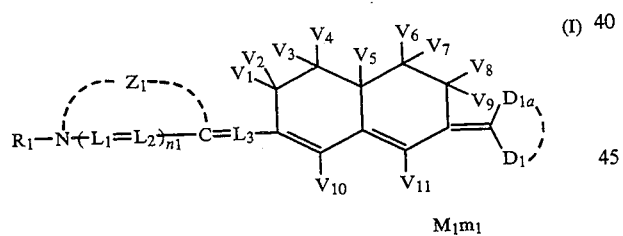

wherein $Z_1$ represents an atomic group necessary for forming a 5-membered or 6-membered nitrogen-containing heterocyclic ring;

$R_1$ represents an alkyl group;

$D_1$ and $D_{1a}$ each represents an atomic group necessary for forming an acyclic or cyclic acidic nucleus;

$V_1$, $V_2$, $V_3$, $V_4$, $V_5$, $V_6$, $V_7$, $V_8$, $V_9$, $V_{10}$ and $V_{11}$ each represents a hydrogen atom or a monovalent substituent;

$L_1$, $L_2$ and $L_3$ each represents a methine group;

$M_1$ represents a charge-neutralizing pair ion;

$m_1$ represents a number of 0 or more necessary for neutralizing the charge in the molecule; and $n_1$ represents 0 or 1.

2. A silver halide photographic material comprising a light-sensitive silver halide emulsion layer spectrally sensitized with a spectral sensitizing dye represented by a formula (II):

and wherein $Z_2$ and $Z_4$ each has the same meaning as $Z_1$;

$R_2$ and $R_4$ each has the same meaning as $R_1$;

$R_3$ represents an alkyl group, an aryl group or a heterocyclic group;

$D_2$ and $D_{2a}$ each has the same meaning as $D_1$ and $D_{1a}$;

$Z_3$ represents an atomic group necessary for forming a 5-membered or 6-membered nitrogen-containing heterocyclic ring;

$V_{12}$, $V_{13}$, $V_{14}$, $V_{15}$, $V_{16}$, $V_{17}$, $V_{18}$, $V_{19}$, $V_{20}$, $V_{21}$ and $V_{22}$ each has the same meaning as $V_1$, $V_2$, $V_3$, $V_4$, $V_5$, $V_6$, $V_7$, $V_8$, $V_9$, $V_{10}$ and $V_{11}$;

$L_4$, $L_5$, $L_6$, $L_7$, $L_8$, $L_9$, $L_{10}$, $L_{11}$, $L_{12}$ and $L_{13}$ each has the same meaning as $L_1$, $L_2$ and $L_3$;

$M_2$ has the same meaning as $M_1$;

$m_2$ has the same meaning as $m_1$;

$n_2$ and $n_4$ each represents 0 or 1; and $n_3$ and $n_5$ each represents an integer of 0 or more.

3. The silver halide photographic material as in claim 1, wherein the heterocyclic ring formed by $Z_1$ is a benzothiazole, naphthothiazole, benzoxazole, naphthoxazole, benzimidazole, 2-quinoline or 4-quinoline nucleus.

4. The silver halide photographic material as in claim 1, wherein $R_1$ is an unsubstituted alkyl, carboxyalkyl, sulfoalkyl, or methanesulfonylcarbamoylmethyl group.

5. The silver halide photographic material as in claim 1, wherein $D_1$ and $D_{1a}$ form a 3-alkylrhodanine, 3-alkyl-2-thioxazolidine-2,4-dione or 3-alkyl-2-thiohydantoin nucleus.

6. The silver halide photographic material as in claim 2, wherein the heterocyclic ring formed by $Z_2$ or $Z_4$ is a benzothiazole, naphthothiazole, benzoxazole, naphthoxazole, benzimidazole, 2-quinoline or 4-quinoline nucleus.

7. The silver halide photographic material as in claim 2, wherein $R_2$ or $R_4$ is an unsubstituted alkyl, carboxyalkyl, sulfoalkyl, or methanesulfonylcarbamoylmethyl group.

8. The silver halide photographic material as in claim 2, wherein $R_3$ is a methyl, ethyl, 2-carboxyethyl, carboxymethyl, 2-sulfoethyl, 3-sulfopropyl, 4-sulfobutyl, 3-sulfobutyl or methanesulfonylcarbamoylmethyl group.

9. The silver halide photographic material as in claim 2, wherein $D_2$ and $D_{2a}$ form a 3-alkylrhodanine, 3-alkyl-2-thioxazolidine-2,4-dione or 3-alkyl-2-thiohydantoin nucleus.

* * * * *